US012664204B1

(12) United States Patent
Bhat et al.

(10) Patent No.: US 12,664,204 B1
(45) Date of Patent: Jun. 23, 2026

(54) ONTOLOGY-DRIVEN DISTRIBUTED AGENT MEMORY MESH

(71) Applicant: Citibank, N.A., New York, NY (US)

(72) Inventors: Ganesh Prasad Bhat, West Orange, NJ (US); James Myers, New York, NY (US); Prashant Praveen, New York, NY (US)

(73) Assignee: Citibank, N.A., New York, NY (US)

( * ) Notice: Subject to any disclaimer, the term of this patent is extended or adjusted under 35 U.S.C. 154(b) by 0 days.

(21) Appl. No.: 19/327,334

(22) Filed: Sep. 12, 2025

(51) Int. Cl.
| | |
|---|---|
| *G06F 16/36* | (2019.01) |
| *G06F 16/28* | (2019.01) |
| *H04L 9/00* | (2022.01) |
| *H04L 9/06* | (2006.01) |

(52) U.S. Cl.
CPC .......... *G06F 16/367* (2019.01); *G06F 16/282* (2019.01); *H04L 9/0643* (2013.01); *H04L 9/50* (2022.05)

(58) Field of Classification Search
CPC ... G06F 16/367; G06F 16/282; H04L 9/0643; H04L 9/50
See application file for complete search history.

(56) References Cited

U.S. PATENT DOCUMENTS

| | | | |
|---|---|---|---|
| 2022/0197625 A1* | 6/2022 | Franchitti | G06N 5/022 |
| 2024/0119232 A1* | 4/2024 | Galitsky | G06F 40/35 |

* cited by examiner

*Primary Examiner* — Aleksandr Kerzhner
*Assistant Examiner* — Samuel C Sharpless, III
(74) *Attorney, Agent, or Firm* — Perkins Coie LLP; Sumedha Ahuja; Willa Wu

(57) ABSTRACT

The systems and methods disclosed herein orchestrate memory sharing among autonomous (or semi-autonomous) AI agentic models ("agents") by dynamically organizing agent memories based on operational characteristics, taxonomic classifications, and/or other factors. Received operational data (e.g., token sets) are mapped to predefined taxonomic nodes (e.g., taxonomic node subsets) based on a degree of similarity between the operational data and predefined taxonomic nodes. An ontological reference pointer is determined for the operational data based on a position of the taxonomic node subset within the ontological data structure. The operational data is compressed into a memory capsule data structure using the ontological reference pointer. A blockchain transaction identifier is generated for the memory capsule data structure and stored in a distributed network accessible to multiple agents. Retrieval agents can request specific memory capsule data structures by providing ontological parameter(s) and/or similarity thresholds, thus enabling identification and transmission of matching memory capsule data structures.

20 Claims, 12 Drawing Sheets

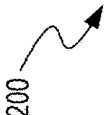

Domain Layer
202

Navigation
- Spatial Reasoning
- Path Planning

Task Execution
- Goal Management
- Resource Allocation

Communication
- Protocol Handling
- Message Routing

Learning
- Pattern Recognition
- Model Updates

Concept Layer
204

Landmark — Location — Route

Priority — Objective — Deadline

Sender — Message — Topic

Feature — Pattern — Model

Instance Layer
206

Memory Instance #1
Type: Navigation
Location: Building A
Timestamp: 2000-01-15T10:30

Memory Instance #2
Type: Task
Objective: Deliver Package
Priority: High

Memory Instance #3
Type: Communication
Sender: Agent-Beta
Topic: Coordination

Memory Instance #4
Type: Learning
Pattern: Obstacle Avoidance
Confidence: 0.95

Figure 6:
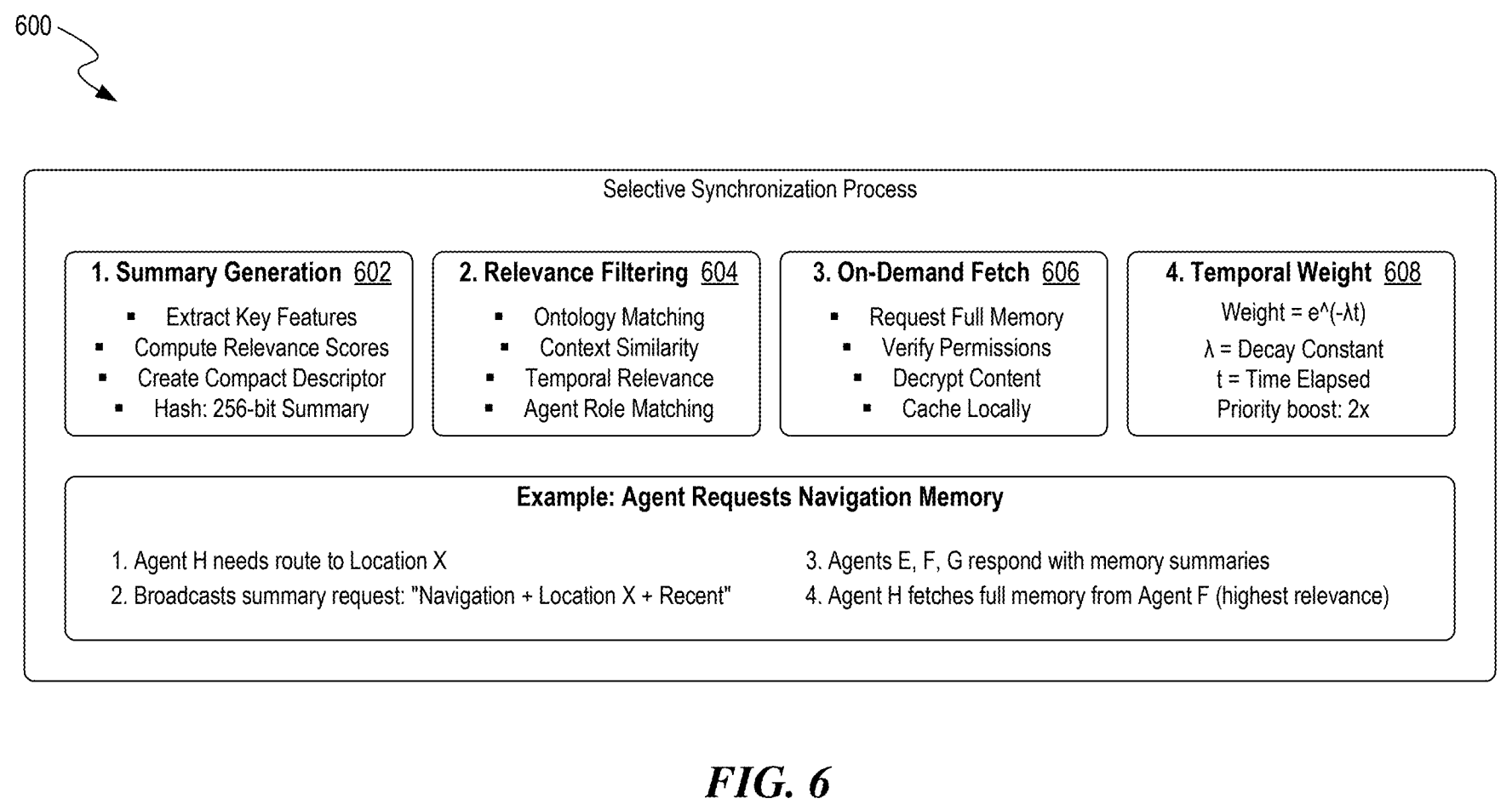

Selective Synchronization Process

1. Summary Generation 602
- Extract Key Features
- Compute Relevance Scores
- Create Compact Descriptor
- Hash: 256-bit Summary

2. Relevance Filtering 604
- Ontology Matching
- Context Similarity
- Temporal Relevance
- Agent Role Matching

3. On-Demand Fetch 606
- Request Full Memory
- Verify Permissions
- Decrypt Content
- Cache Locally

4. Temporal Weight 608

Weight = e^(-λt)

λ = Decay Constant
t = Time Elapsed
Priority boost: 2x

Example: Agent Requests Navigation Memory

1. Agent H needs route to Location X
2. Broadcasts summary request: "Navigation + Location X + Recent"

3. Agents E, F, G respond with memory summaries
4. Agent H fetches full memory from Agent F (highest relevance)

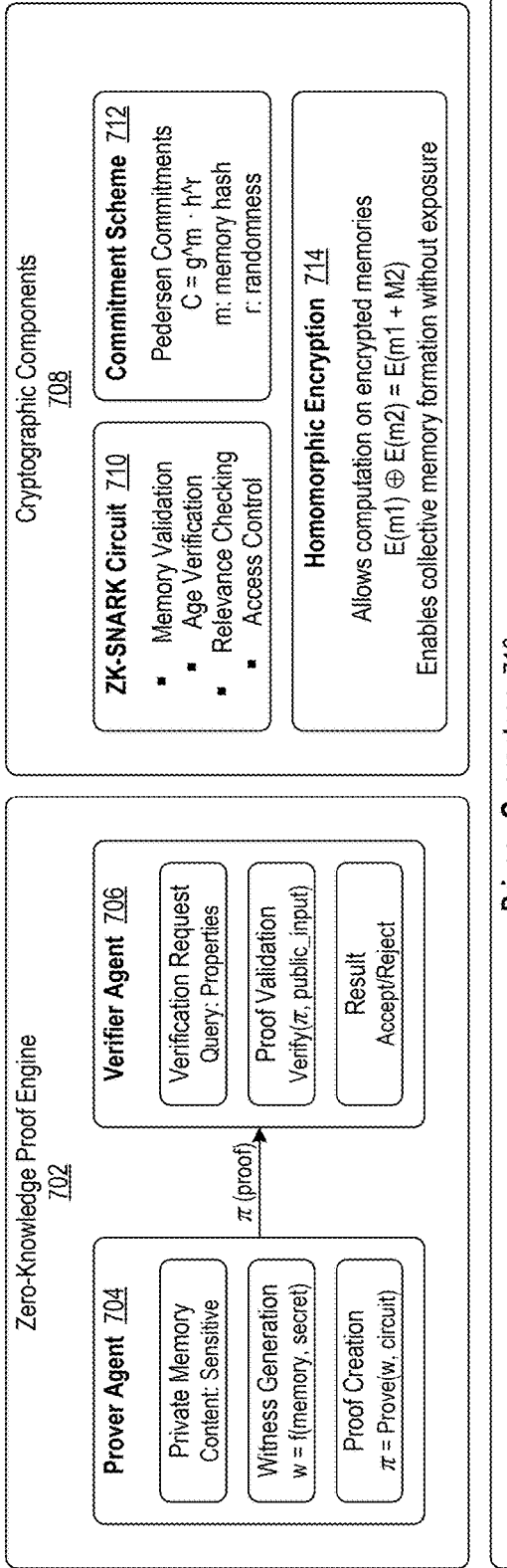

Zero-Knowledge Proof Engine 702

Prover Agent 704

Private Memory
Content: Sensitive

Witness Generation
w = f(memory, secret)

Proof Creation
π = Prove(w, circuit)

π (proof)

Verifier Agent 706

Verification Request
Query: Properties

Proof Validation
Verify(π, public_input)

Result
Accept/Reject

Cryptographic Components 708

ZK-SNARK Circuit 710

- Memory Validation
- Age Verification
- Relevance Checking
- Access Control

Commitment Scheme 712

Pedersen Commitments
$C = g^m \cdot h^r$
m: memory hash
r: randomness

Homomorphic Encryption 714

$E(m1) \oplus E(m2) = E(m1 + M2)$
Allows computation on encrypted memories
Enables collective memory formation without exposure

Privacy Guarantees 716

Memory Content Privacy

- Zero Knowledge of Content
- Only Properties Revealed
- No Inference Attacks

Agent Identity Protection

- Anonymous Validation
- Ring Signatures
- Unlinkable Transactions

Selective Disclosure

- Granular Permissions
- Attribute-Based Access
- Dynamic Revelation

Audit Trail Privacy

- Encrypted Logs
- Verifiable History
- No Metadata Leaks

Example: Validating Memory Without Revealing Content

Scenario

Agent A has navigation memory for
restricted area
agent B needs to verify without seeing
details

Proof Generation

Agent A creates ZK proof:
- Has Valid Route
- Route Updated < 24h Ago
- Has Security Clearance

Verification Result

Agent B verifies proof 3
Knows: Valid Route Exists
Doesn't Know: Actual Route Details
Decision: Trust Agent A's Guidance

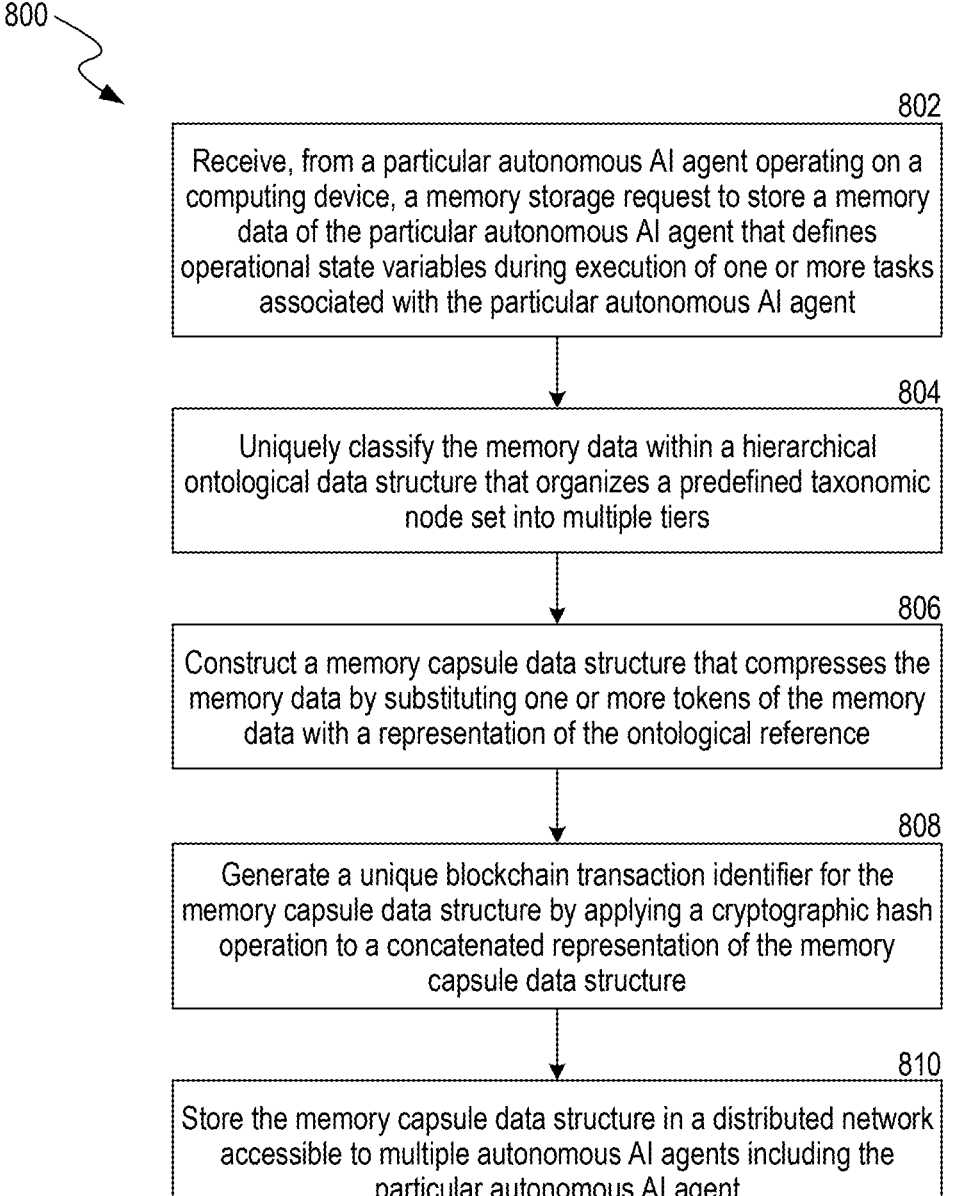

800

802

Receive, from a particular autonomous AI agent operating on a computing device, a memory storage request to store a memory data of the particular autonomous AI agent that defines operational state variables during execution of one or more tasks associated with the particular autonomous AI agent

804

Uniquely classify the memory data within a hierarchical ontological data structure that organizes a predefined taxonomic node set into multiple tiers

806

Construct a memory capsule data structure that compresses the memory data by substituting one or more tokens of the memory data with a representation of the ontological reference

808

Generate a unique blockchain transaction identifier for the memory capsule data structure by applying a cryptographic hash operation to a concatenated representation of the memory capsule data structure

810

Store the memory capsule data structure in a distributed network accessible to multiple autonomous AI agents including the particular autonomous AI agent

*FIG. 8*

ONTOLOGY-DRIVEN DISTRIBUTED AGENT MEMORY MESH

BACKGROUND

An artificial intelligence (AI) agentic model ("agent"), whether autonomous or semi-autonomous, refers to a persistent software and/or hardware entity characterized by a digitally encoded objective function. The objective function can instruct the agent to, for example, maximize task accuracy, minimize resource usage, comply with specified operational constraints, and the like. The degree of autonomy can range from semi-autonomous, where human intervention is occasionally used, to fully autonomous, where the agent operates independently within defined parameters. Agents use received data (e.g., an input, a prompt, a query) to autonomously trigger and manage actions such as application programming interface (API) invocations, outbound network requests, updates to internal or external datastores, and other computational tasks.

The actions autonomously executed by agents are responsive to their respective objective functions. For example, an agent's objective function may direct the agent to minimize task completion latency. During autonomous execution, the agent can determine a degree of expected utility of candidate actions by evaluating the actions against the agent's objective function and select executable actions that align with the agent's assigned objectives within the imposed operational constraints or boundaries set by the system the agent is interacting with. However, agent memories (e.g., operational state variables for actions executed by the agent) are typically stored in isolated, agent-specific repositories that are inaccessible to other agents within multi-agent environments.

BRIEF DESCRIPTION OF THE DRAWINGS

FIG. 2 shows a schematic illustrating an example environment of a hierarchal ontology engine of an agent management platform, in accordance with some implementations of the present technology.

FIG. 6 is a flow diagram illustrating an example process of selective synchronization of agent memories using an agent management platform, in accordance with some implementations of the present technology.

FIG. 7 shows a schematic illustrating an example environment of sharing agent memories while preserving privacy using an agent management platform, in accordance with some implementations of the present technology.

FIG. 8 is a flow diagram illustrating an example process of maintaining agent memory of AI agents using an agent management platform, in accordance with some implementations of the present technology.

Figure 1:
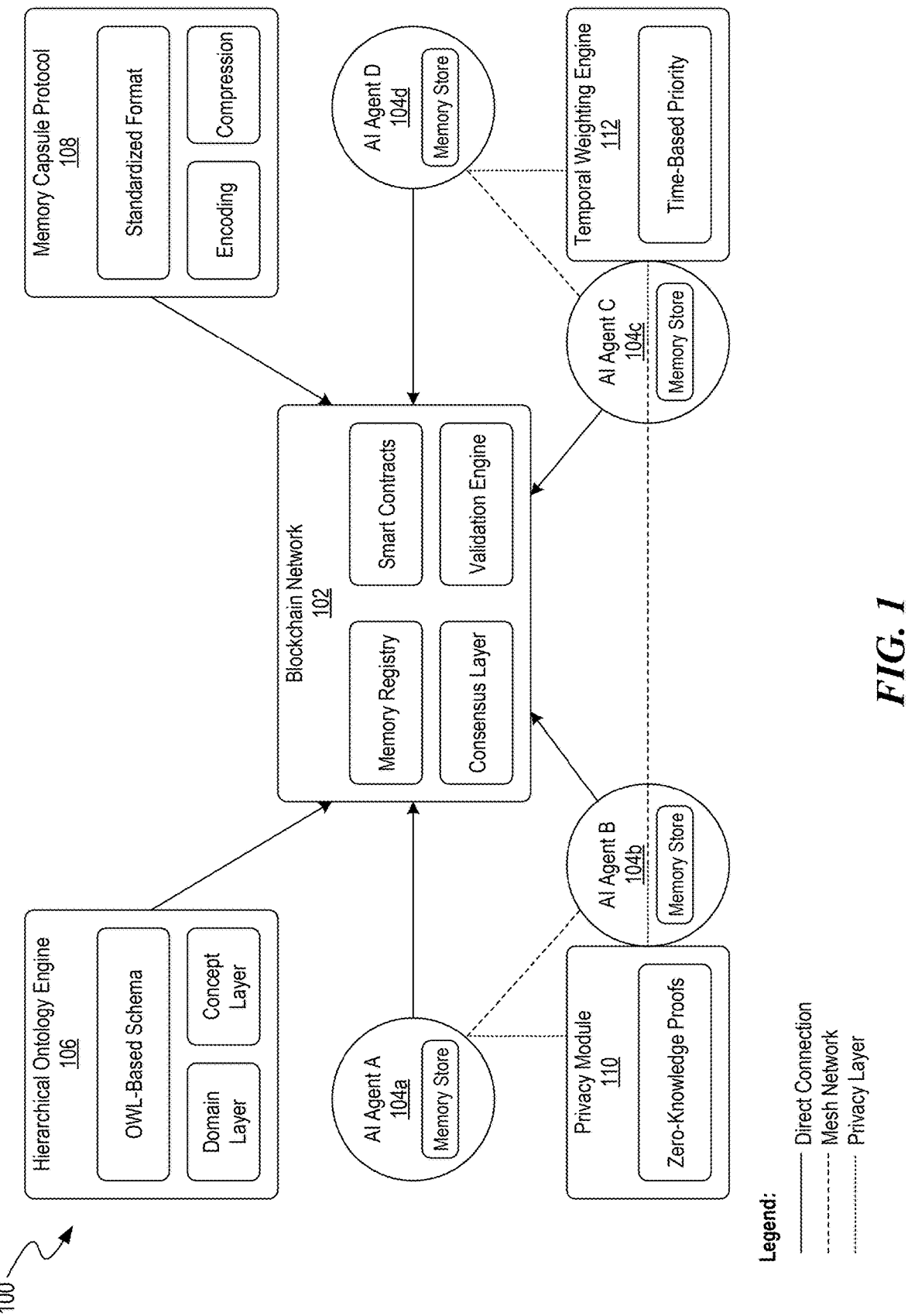
FIG. 1 shows a schematic illustrating an example environment of an ontology-driven distributed agent memory mesh of an agent management platform, in accordance with some implementations of the present technology.

The technologies described herein will become more apparent to those skilled in the art from studying the Detailed Description in conjunction with the drawings. Implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Traditional machine learning and large language models (LLMs) are typically designed as static, monolithic models. These models are trained on broad (i.e., general) datasets and, once deployed, respond to inputs strictly based on internal representations—that is, the way information, patterns, and relationships learned from training data are encoded and stored within the model's architecture as parameters, embeddings, and/or latent features. The internal representations enable the model to interpret and generate responses to new inputs by referencing what has been encoded during training. To update the internal representations, the models are retrained. In contrast, AI agents are persistent software and/or hardware entities characterized by objective functions and varying degrees of autonomy. Agents can perceive environments (e.g., via sensors), make decisions, execute actions, and optimize their behavior with respect to defined objective functions. Autonomous or semi-autonomous agents can independently process incoming data, determine action plans, and dynamically invoke APIs, databases, other agents, or external services to execute tasks.

Distributed AI agent networks introduce additional technical complexity compared to single-agent architectures. In distributed AI agent networks, multiple agents are deployed across a network (often spanning multiple machines, cloud instances, or edge devices), with each agent maintaining its own computational resources (CPU, GPU, memory), local knowledge base, and/or processing logic. Agents can communicate using standardized protocols (e.g., HTTP, gRPC, message queues) and can coordinate actions or share state with other agents in the network. Each agent can independently perceive its local environment, make decisions, and execute actions, but also collaborate to achieve shared goals.

A technical challenge in distributed AI agent networks arises from the independence of agents operating across heterogeneous environments. Because each agent continually generates local memories (e.g., data and signals) based on its own perception and objectives, agents regularly fail to detect, capture, or correctly interpret data and signals (such as operational signals, task status updates, or environmental cues) previously recognized by other agents in the network. The internal states of one agent remain inaccessible to others within the same multi-agent environment. This results in agents missing existing context, duplicating operations, or executing actions on incomplete information.

Memory, as used herein, refers to a structured digital representation of a model's (such as an AI agent's) operational data, such as its runtime state, environmental context, interaction metadata, and so forth, that captures one or more dimensions of a model's inputs, outputs, decision-making operations, and/or execution outcomes. Memory can include raw sensory data collected through the model's input mechanisms such as sensor readings, API responses, database query results, and inter-agent communications, as well as processed information including feature extractions, pattern recognitions, and/or learned model parameters derived from the model's analysis of environmental stimuli. The memory can include contextual metadata that describes the circumstances under which the operational data was received/generated, including temporal timestamps with nanosecond precision, environmental conditions, model internal states, objective function parameters, and/or causal relationships between inputs, decisions, and outcomes.

Attempting to create a system to manage (e.g., store, retrieve, share) memories (e.g., operational data such as data streams, data signals, or data elements associated with an agent's operations/tasks) within distributed AI agent networks in view of the available conventional approaches created significant technological uncertainty, especially in environments comprised of large, heterogeneous agent populations with different capabilities and dynamic operational requirements. Creating such a system requires addressing several unknowns in conventional distributed agent coordination techniques, including the scalability limitations, and privacy constraints in existing distributed AI agent networks. To overcome the technological uncertainties, the inventors systematically evaluated multiple design alternatives. For example, the inventors evaluated systems that relied on centralized memory stores (e.g., a central node, a central server, a central computing device) to store agent memories in autonomous agent networks.

However, as the population of agents increases, each agent is required to access and update memory through the same central node, which can cause transaction congestion and increasing latency. The central node therefore not only maintains indices for all memory submitted by heterogeneous agents but also continuously resolve concurrent queries and updates. This focalization of memory management leads to resource exhaustion and reduced throughput as request volume grows, and exposes the network to availability risks. For example, if the central memory store fails or becomes unreachable, agents lose the capacity to record, share, or validate memories, thereby potentially disrupting network-wide operations.

The inventors also systematically evaluated standard indexing, tag-based, and search mechanisms applied to memory entries in conventional centralized memory stores, such as methods that store the memory entries as undifferentiated or semi-structured data. However, during recall, agents are typically required to run computationally expensive searches across vast, non-prioritized datasets and examine irrelevant memory entries and scanning unindexed fields. Therefore, agents waste substantial CPU cycles and memory bandwidth performing exhaustive queries and post-hoc filtering. This inefficiency is magnified in large networks, where agents repeatedly access and process memory items unrelated to their situational context or operational requirements.

Further, in conventional centralized memory stores, obsolete or low-priority memories remain globally accessible, thereby cluttering memory stores and leading agents to inadvertently recall or reuse stale operational data. As agents continuously generate and store new operational data, the centralized memory store accumulates a growing volume of outdated or superseded entries. Retrieval operations typically process the entire dataset, including both recent and obsolete records, during search and recall procedures. This accumulation not only increases the computational burden on the system, as agents expend additional resources parsing irrelevant data, but also degrades the accuracy of retrieval results. Agents are more likely to encounter and act upon stale information, which can lead to suboptimal or otherwise erroneous decision-making.

In addition, the heterogeneity of agent architectures introduces significant interoperability technical challenges in distributed agent networks. Each agent may implement its own approach to defining, encoding, and serializing memory objects, and often relies on local schemas, proprietary data models, or local encoding standards tailored to its specific operational requirements. The inconsistencies can manifest at both the syntactic level, such as differences in data structure, field naming, or serialization protocols, and the semantic level, including variations in how concepts, relationships, and metadata are represented. As a result, when agents attempt to exchange or use memory objects from peers, the agents frequently encounter incompatibilities that prevent direct translation of the shared data.

Multi-party computation in distributed agent networks enable agents to validate, process, or aggregate memory objects pertaining to collaborative tasks. However, conventional memory sharing systems typically require full visibility or direct access to the original agent memory contents, thereby requiring agents to reveal protected information to achieve operational consensus, compliance verification, aggregate result computation, and so forth. This results in unnecessary exposure of sensitive or proprietary information, which increases the risk of data leakage, regulatory non-compliance, and adversarial exploitation, especially in systems where agents participating in the computation represent different entities (e.g., owners, security profiles, or legal jurisdictions).

As such, the inventors have developed systems (hereinafter "agent management platform") and related methods to orchestrate memory sharing among autonomous (or semi-autonomous) AI agentic models ("agents") by dynamically organizing agent memories based on operational characteristics, taxonomic classifications, and/or other factors. Received operational data (e.g., token sets) are mapped to predefined taxonomic nodes (e.g., taxonomic node subsets) based on a degree of similarity between the operational data and predefined taxonomic nodes. An ontological reference pointer is determined for the operational data based on a position of the taxonomic node subset within the ontological data structure. The operational data is compressed into a memory capsule data structure using the ontological reference pointer. A blockchain transaction identifier is generated for the memory capsule data structure and stored in a distributed network accessible to multiple agents. Retrieval agents can request specific memory capsule data structures by providing ontological parameter(s) and/or similarity thresholds, thus enabling identification and transmission of matching memory capsule data structures.

Further, the agent management platform disclosed herein generates compressed memory summaries to enable agents to evaluate memory utility without downloading the complete memory content, thereby reducing network bandwidth consumption and improving response times for memory retrieval operations. By transmitting only the summary data during initial queries, the agent management platform significantly reduces network bandwidth consumption and reduces the computational overhead used for memory evaluation. Agents can filter and select only those memories that meet their operational criteria before requesting full access.

In some implementations, the agent management platform uses zero-knowledge cryptographic proof systems, such as zk-SNARKs, to enable memory validation and authenticity verification without content disclosure, thereby enabling agents to confirm memory properties such as creation time, domain classification, and/or compliance with access policies while maintaining privacy of the underlying operational data. Other agents or validators can use the proofs to confirm the authenticity of the memory, ensuring that only valid and policy-compliant memories are accepted into the network.

The agent management platform can use temporal weighting engines that apply exponential decay functions to automatically adjust memory priority scores based on elapsed time since creation or last access. This ensures that recent and frequently accessed memories can receive higher retrieval priority, while older memories gradually decrease in influence without requiring manual intervention or explicit deletion operations. By continuously adjusting memory priorities based on temporal factors, the agent management platform ensures that agents are less likely to recall or act upon stale data and improves decision accuracy.

While the current description provides examples related to large language models (LLMs) and agents, one of skill in the art would understand that the disclosed techniques can apply to other forms of machine learning or algorithms, including unsupervised, semi-supervised, supervised, and reinforcement learning techniques. For example, the disclosed agent management platform can evaluate model outputs from support vector machine (SVM), k-nearest neighbor (KNN), decision-making, linear regression, random forest, naïve Bayes, or logistic regression algorithms, and/or other suitable computational models.

In the following description, for the purposes of explanation, numerous specific details are set forth in order to provide a thorough understanding of implementations of the present technology. It will be apparent, however, to one skilled in the art that implementation of the present technology can be practiced without some of these specific details.

The phrases "in some implementations," "in several implementations," "according to some implementations," "in the implementations shown," "in other implementations," and the like generally mean the specific feature, structure, or characteristic following the phrase is included in at least one implementation of the present technology and can be included in more than one implementation. In addition, such phrases do not necessarily refer to the same implementations or different implementations.

Overview of the Agent Management Platform

FIG. 1 shows a schematic illustrating an example environment 100 of an ontology-driven distributed agent memory mesh of an agent management platform, in accordance with some implementations of the present technology. The environment 100 can be implemented using components of example computer system 1000 illustrated and described in more detail with reference to FIG. 10. Likewise, implementations of example environment 100 can include different and/or additional components or can be connected in different ways.

The environment 100 can be used to store and/or retrieve memory data. Memory data is defined as a structured digital representation of an AI agent's operational experience, runtime state, environmental context, and/or interaction metadata. In some implementations, each unit of memory data is encapsulated within a memory capsule (i.e., a composite, cryptographically identifiable data object). The capsule's header encodes the unique capsule identifier (using cryptographic hash functions such as SHA-256), agent-specific public identity (e.g., Agent ID), creation timestamp (e.g., Unix epoch format), protocol version, priority scalar, and so forth. Memory data can include hierarchical metadata that links the memory data to an ontology-driven classification, such as one defined by a domain layer (categorizing the agent's macro-level function, e.g., navigation or learning), concept layer (representing task-specific abstractions such as objectives, patterns, or messages), and instance layer (identifying operational parameters tied to unique agent-task-context tuples). The memory capsule can include compressed experiential data (which can be encoded for off-chain storage such as IPFS) that is referenced within the blockchain network for indexing.

The agent management platform stores and retrieves the memory data using a blockchain network 102 (e.g., a distributed ledger) that provides tamper-resistant storage for memory data, access logs, and smart contracts. A blockchain network refers to a decentralized network of computing nodes that maintain synchronized copies of an immutable distributed ledger through cryptographic consensus operations, where each block contains cryptographically hashed references to previous blocks, thus forming an unalterable chain of transaction records. For example, each node in the network maintains an identical copy of the blockchain, which can be a chronologically-ordered sequence of blocks. Each block contains a cryptographic hash of the previous block, a timestamp, and a collection of validated transactions, thereby creating an immutable chain structure that prevents unauthorized modifications without detection.

The blockchain network 102 can be implemented as a consortium chain optimized for (or otherwise configured for) agent interactions. The consortium chain is a specific type of distributed ledger system in which consensus and governance are maintained by a predetermined and restricted group of trusted organizations or entities (e.g., agent), rather than by any member (e.g., agent) of the public. The consortium chain structure provides permissioned access, meaning only those organizations or nodes that have been explicitly invited or authorized may participate in the process of validating transactions, appending new blocks, or modifying system rules. Such a configuration offers greater operational efficiency, privacy, and control than public blockchains, since it limits the risk of malicious activity by ensuring that all participants are validated. In some implementations, the consortium chain enables agent interactions with sub-second finality (or finality below a pre-defined threshold), meaning that the point at which a submitted transaction is irreversibly recorded in the ledger, with no risk of subsequent reversal, reordering, or modification, is less than one second.

Within the blockchain network 102, a memory registry operates as an on-chain, cryptographically indexed authority that can map memory data (e.g., memory capsule identifiers) to their corresponding storage locations and associated ontological metadata. The memory registry can use smart contracts that encode deterministic logic (e.g., governing logic for memory admission, storage, access permissions, and authorized lifecycle events such as memory creation (store-Memory), permission assignment, or cross-agent sharing) to manage interactions between agents. Each smart contract invocation can yield state transitions of the agent that is recorded immutably on the distributed ledger to provide both a tamper-resistant audit trail and global consistency of memory operations.

Within the blockchain network 102, a consensus layer ensures that proposed memory transactions to store memory data originating from agents or management platforms are subject to validation by, for example, a quorum of network nodes. The consensus layer can verify that transactions reference valid, non-redundant capsule identities, satisfy temporal and semantic constraints asserted by their metadata, and so forth. Only upon successful quorum agreement are updates finalized and reflected in the memory registry's state. For example, the consensus layer can use a validation engine to execute policy checks (e.g., for structural compliance with protocol schemas, verify cryptographic proof objects, and so forth). Memory data that fails these checks are rejected on-chain.

Agent interfaces are software modules that enable multiple AI agents 104 (e.g., a first AI agent 104a, a second AI agent 104b, a third AI agent 104c, a fourth AI agent 104d, and so forth) to interact with the memory mesh (e.g., the agent management platform), including interactions such as authentication, transaction management, and/or local memory caching. The agents 104 refer to a persistent software entity that can be characterized by a digitally encoded objective function (e.g., maximization of task accuracy, minimization of resource usage, compliance with specified policy constraints). The instantiation of the objective function can be static (e.g., assigned at deployment) or dynamic, enabling runtime adaptation of the objective function in response to changes in environmental signals (such as resource state, input task complexity, geopolitical events, market data, user context, and the like). The agents 104 are enabled to receive unstructured, semi-structured, or structured environmental signals (e.g., communications from other agents 104), and use the environmental signals to autonomously trigger and manage actions such as application programming interface (API) invocations, outbound network requests, updates to internal or external datastores, and so forth.

The memory mesh constitutes a distributed network topology where memory resources are interconnected through peer-to-peer connections to form a mesh-like structure that enables the agents 104 to access and share memories (e.g., operational state variables stored in a memory store of an agent) across multiple nodes without relying on centralized storage infrastructure. For example, the agents 104 can be structured as a network and/or a "constellation" of agents. The agents 104 can be interconnected such that each agent operates as an autonomous or semi-autonomous node enabled to perform direct peer-to-peer interactions and/or hierarchical delegation. For example, a general agent can perform query parsing and context recognition, but subsequently route specialized sub-tasks to sub-agents with subject matter expertise (SMEs) (e.g., trained on a domain-specific dataset) in specific domains such as legal compliance, financial analysis, and so forth.

The actions autonomously executed by the agents 104 can be responsive to a respective objective function of the agent. For example, an agent's objective function may direct it to maximize retrieval accuracy from a specific database, minimize task completion latency, or balance multiple criteria based on predefined weights. During autonomous execution, the agent 104 can determine a degree of expected utility of candidate actions by evaluating them against the agent's objective function and select executable actions that align with the agent's assigned objectives within any imposed operational constraints or boundaries set by the agent management platform.

A hierarchal ontology engine 106 refers to a knowledge representation system used by the blockchain network 102. For example, the hierarchal ontology engine 106 uses a schema based on Web Ontology Language (OWL) 2 DL (Description Logic) or another schema that organizes memories across hierarchical layers. The hierarchal ontology engine 106 encodes entities (such as tasks, places, or events), their attributes, and the relationships between them using predefined logic, which enables computational inference, classification, and interoperability among heterogeneous agents. The hierarchal layers can include, for example, a domain layer, e.g., for high-level categorization such as navigation, task execution, communication, and/or learning, a concept layer, e.g., for mid-level abstractions such as location, objective, message, and/or pattern, and an instance layer, e.g., for specific memory instances with full contextual data.

The domain layer provides high-level categorization of knowledge to enable coarse classification and semantic partitioning by grouping memories into overarching themes such as navigation (i.e., information related to movement, routes, mapping, or spatial orientation), task execution (i.e., procedures, workflows, sequences of actions, or operational plans), communication (i.e., messages exchanged, dialogue states, intentions, or language processing events), and learning (i.e., adaptation, concept acquisition, model updates, or performance improvement). The concept layer provides mid-level abstractions by identifying specific data points that represent types or categories associated with each domain. For example, within a navigation domain, the concept layer can include abstractions such as location (places, geographic coordinates, virtual areas), objective (agent goals or targets), message (individual communication units or data packets), and pattern (recognizable regularities or trends). The instance layer identifies specific memory instances linked to the full operational (e.g., memory) data of the particular memory to be stored. The instance layer can include an identifier that identifies the corresponding domain and categories that are mapped to a particular instance.

A memory capsule protocol 108 refers to a standardized format for memory encoding applied to the memory data to be stored on the blockchain network 102. For example, the memory capsule protocol 108 includes a header (e.g., Capsule ID, Agent ID, timestamp, version, priority, time-to-live (TTL)), metadata (e.g., ontology references, domain classification, access control lists), content (e.g., Compressed memory data stored on an InterPlanetary File System (IPFS) with blockchain reference), cryptographic proof (e.g., zero-knowledge (ZK) proof of memory validity), and so forth. The memory capsule protocol 108 enables the agent management platform to package and manage memory information produced by AI agents so the memory information can be stored, transmitted, and/or verified within a distributed system such as the distributed network accessible to all agents.

The header can identify identification and control information. For example, Capsule ID refers to a globally unique identifier generated through cryptographic hash functions, Agent ID refers to the originating agent's cryptographic identity using public key fingerprints, timestamp refers to the creation time using coordinated universal time, version refers to the protocol revision number, priority assigns relative importance values that are used in subsequent retrieval (e.g., during filtering), and TTL defines the expiration period for automatic memory cleanup to prevent storage overflow. Metadata can include structured descriptive information including ontology references that specify the memory's position within the hierarchal ontology used by the hierarchical ontology engine 106 (e.g., using URI-based identifiers that link to specific taxonomic nodes). Content refers to the actual or observed memory payload stored as compressed memory data on IPFS or other peer-to-peer file storage system. The cryptographic proof can include zero-knowledge (ZK) proofs of memory validity that enable one party to demonstrate knowledge of specific information to another party without revealing any details about the underlying information itself.

A privacy module 110 within a privacy layer can implement zero-knowledge proof systems (zk-SNARKs) enabling memory validation without content disclosure. For example, the privacy module 110 can generate cryptographic parameters specific to the kinds of properties the privacy module 110 is attempting to validate (properties such as the proper creation of a memory capsule, age, or conformity with certain security or access constraints). Whenever an agent 104 seeks to validate a memory, the agent 104 organizes the relevant memory data (e.g., including metadata and compressed content) according to the memory capsule protocol 108. The agent (acting as the "prover") constructs a "witness." The witness is not the direct content of the memory, but rather a computationally derived commitment representing selective properties, and can include hashed segments, ontological identifiers, and validation boundaries (such as creation time, security clearance, or role privilege). The privacy module 110 uses this witness alongside capsule-related public data (e.g., including metadata fields, access control descriptors, and blockchain-published references) to generate a condensed, non-interactive proof. The proof encodes the logical mapping from witness data to allowed public assertions (for example, "this memory instance was generated within the past 24 hours and by an authorized agent"), ensuring that only those aspects used for compliance and authentication are exposed, while the substantive memory details remain cryptographically concealed. Upon generation, the proof can be broadcasted to other agents or smart contract validators within the distributed memory mesh. Validation nodes receive these inputs and can cryptographically bind the proof to the memory capsule's public attributes (such as its hash pointer in decentralized storage, ontological reference pointer, and access authentication constraints). The network nodes can be configured to accept the proof's validity only if the cryptographic linkage between the witness representation, publicly asserted claims, and capsule's blockchain-recorded transactions are consistent and complete.

A temporal weighting engine 112 can manage time-based memory priority using exponential decay functions. The temporal weighting engine 112 can operate by continuously recalibrating the effective priority of each memory capsule as a direct function of temporal progression within the system. When a memory capsule is instantiated or accessed, its timestamp, which can be encoded in a compact binary representation such as Unix epoch time, is embedded within the capsule's metadata header. The capsule's initial priority score and a reference to its specific decay configuration can be stored in dictionary-coded binary fields. During ongoing operation, the temporal weighting engine 112 queries (on a scheduled basis or in response to event triggers) the temporal metadata of one or more managed capsules. For each capsule, the temporal weighting engine 112 determines the elapsed time (t) since its origin or last interaction. This temporal delta becomes the argument to an exponential decay function. To determine the current adjusted priority (P*), the engine multiplies the initial priority (P) by an exponential factor derived from a decay parameter (lambda). The decay parameter refers to the temporal decay rate constant. The decay parameter can be assigned globally for all memories or individually determined based on contextual factors, agent roles, domain-specific requirements, and/or ontological context references encoded within the capsule. The recalculated (P*) is then stored back into the memory capsule's metadata or maintained as an in-memory cache structure. When agents or external systems initiate memory retrieval operations, the temporal weighting engine 112 uses the dynamically updated priorities to rank and filter capsules, ensuring that temporally relevant (i.e., recent and thus more highly weighted) memories are surfaced ahead of older, decayed entries, even as the underlying data remains immutable.

In FIG. 1, direct connections, represented by solid lines, refer to authenticated communication channels between individual AI agents (104a, 104b, 104c, 104d) and the blockchain network 102. Mesh network connections, depicted as dashed lines, refer to communications via a decentralized peer-to-peer topology that enables agents 104 to directly communicate with other agents 104 without routing through the central blockchain network 102. Privacy layer connections, illustrated as dotted lines, refer to encrypted communication channels, such as the connection between the second AI Agent 104b and the privacy module 110. Communications within the privacy layer can use zero-knowledge proof operations and/or other verification processes that enable agents to validate memory properties and authenticate shared information without revealing sensitive operational (e.g., memory) data.

FIG. 2 shows a schematic illustrating an example environment 200 of a hierarchal ontology engine of an agent management platform, in accordance with some implementations of the present technology. The environment 200 can be implemented using components of example computer system 1000 illustrated and described in more detail with reference to FIG. 10. Likewise, implementations of example environment 200 can include different and/or additional components or can be connected in different ways.

The hierarchal ontology engine can be organized into a domain layer 202, a concept layer 204, and an instance layer 206. For example, the organization of agent memories can be in accordance with OWL 2 DL standards. This enables domain Layer 202 organization, which can refer to top-level categorization of memories into functional domains such as navigation (e.g., spatial reasoning, path planning, landmark recognition), task execution (e.g., goal management, resource allocation, scheduling), communication (e.g., protocol handling, message routing, collaboration), learning (e.g., pattern recognition, model updates, experience replay), and so forth.

In some implementations, domain categories are predefined, that is, based on a set of established functional areas tailored to the intended application (such as navigation, task execution, or communication). These predefined domains can originate from internal design specifications or be imported from external ontological sources and existing knowledge bases. In some implementations, the hierarchal ontology engine can update the domain layer dynamically over time by learning new domains directly from agent interactions and experience (e.g., via pattern recognition, clustering) or by receiving inputs and updates from system administrators or end users. In some implementations, multiple agents participating in the blockchain network 102 can propose, validate, and collectively agree on new domain definitions or modifications to the domain schema.

Each domain can include interconnected concepts (e.g., the concept layer 204) that forms a knowledge representation structure (e.g., a hierarchal ontological data structure, a semantic network). For example, the navigation domain includes location, landmark, and route concepts with defined relationships. Relationships among concepts are established with object properties or relations. Each concept can be defined as an ontology class using standards such as OWL 2 DL. For example, a "Location" class is linked to a "Landmark" class via a property such as "contains-Landmark," and a "Route" class indicates relationships such as "startsAt" (pointing to a Location) or "includes-Landmark." These relationships can be encoded directly in the knowledge representation structure and can be instantiated as edges in the knowledge representation structure.

Actual memory instances can be stored and/or otherwise identified using metadata in the instance layer 206. The metadata can include, for example, temporal information (creation time, last access, decay rate), relevance scores based on ontological distance (as discussed in further detail with reference to FIG. 8), access permissions and sharing constraints, cryptographic proofs of authenticity, and so forth. Each memory instance can be tagged with temporal information such as a creation timestamp or a last access timestamp to enable the agent management platform to track the lifecycle and recency of every memory. A decay rate parameter governs how memory's priority or relevance decreases over time and can be modeled using an exponential decay function such as weight=$e^{(-\lambda t)}$, where $\lambda$ is the decay constant and t is the elapsed time since creation or last access. Relevance scores refer to ontological distance such as the semantic similarity between the memory's context and the querying agent's requirements.

The hierarchal ontology engine can use Semantic Web Rule Language (SWRL) for inferences across different layers of the knowledge representation structure represented by the hierarchal ontology engine. SWRL refers to a rule-based language that enables the definition of logical rules over the ontology's classes, properties, and individual instances. When applied within the hierarchical ontology engine, SWRL enables the formulation of rules that can connect and reason over data present in the domain, concept, and instance layers. For instance, SWRL can apply logic such as, "If a memory instance pertains to a task completed within the last 24 hours and is rated above a certain confidence threshold, then it should be eligible for high-priority retrieval." In some implementations, the rules can encode patterns such as aggregating events, chaining multiple conditions, or deriving new classifications from existing data.

The hierarchal ontology engine can use a description-logic reasoner such as a Pellet reasoner for consistency checking. Consistency checking refers to the process of verifying that the set of classes, properties, relationships, and constraints defined in the knowledge representation structure do not lead to any logical contradictions or unsatisfiable conditions. For example, consistency checking ensures there are no instances where a class is both a subclass and a disjoint class of itself, or where property restrictions are mutually exclusive. The hierarchal ontology engine can use the description-logic reasoner to examine the class hierarchies (e.g., inheritance and subclassing relationships), property assertions (characteristics, cardinalities, and ranges), and individual data assertions (who belongs to which class, with what properties) to infer logical consequences of the assertions and rules.

The knowledge representation structure defines classes (groupings of concepts), properties (ways entities relate or interact), and individuals (actual examples), along with statements (e.g., axioms) indicating how these pieces connect. The description-logic reasoner uses these axioms, such as "if something belongs to a certain group, it must also belong to a broader group" or restrictions such as "certain relationships can exist only once," and uses predefined logic to build a model of the knowledge representation structure. The description-logic reasoner conducts automated reasoning to check for consistency, derive new relationships that aren't directly stated, and/or classify concepts according to the rules provided. For instance, if the description-logic reasoner indicates that anything labeled as a 'vehicle' is also a 'machine,' and something is known to be a 'vehicle,' the description-logic reasoner can automatically deduce it is a 'machine' as well. The hierarchal ontology engine, in some implementations, generates and/or automatically executes (e.g., via the description-logic reasoner) corrective actions such as revising class definitions, modifying property constraints, or rejecting contradictory memory instances.

In some implementations, the agent management platform dynamically adjusts the knowledge representation structure managed by the hierarchal ontology engine through consensus of agents within the distributed network. In a distributed network, consensus refers to a protocol or process by which multiple independent agents negotiate, validate, and agree upon changes to shared data or schema (in this case, the ontology) without central authority. When agents detect new concepts, domain requirements, or contextual shifts (e.g., novel task types, emergent communication patterns), the agents can propose adjustments or extensions to the ontology, such as adding a domain, modifying a concept's definition, or refining instance attributes. The agent proposed changes can be submitted to a shared ledger (such as a blockchain consortium chain described in the environment 100) and broadcasted to peer agents. The agent management platform can accumulate digital signatures or votes that reflect agent agreement. Consensus algorithms (e.g., Practical Byzantine Fault Tolerance (PBFT), Proof of Authority (PoA), or custom smart contract workflows) verify that proposals meet defined network governance rules and that a sufficient threshold of agents endorse the changes. Once consensus is achieved, the hierarchical ontology engine can automatically apply the agreed-upon adjustments to the knowledge representation structure and distribute the updated schema to agents on the network.

Figure 3:
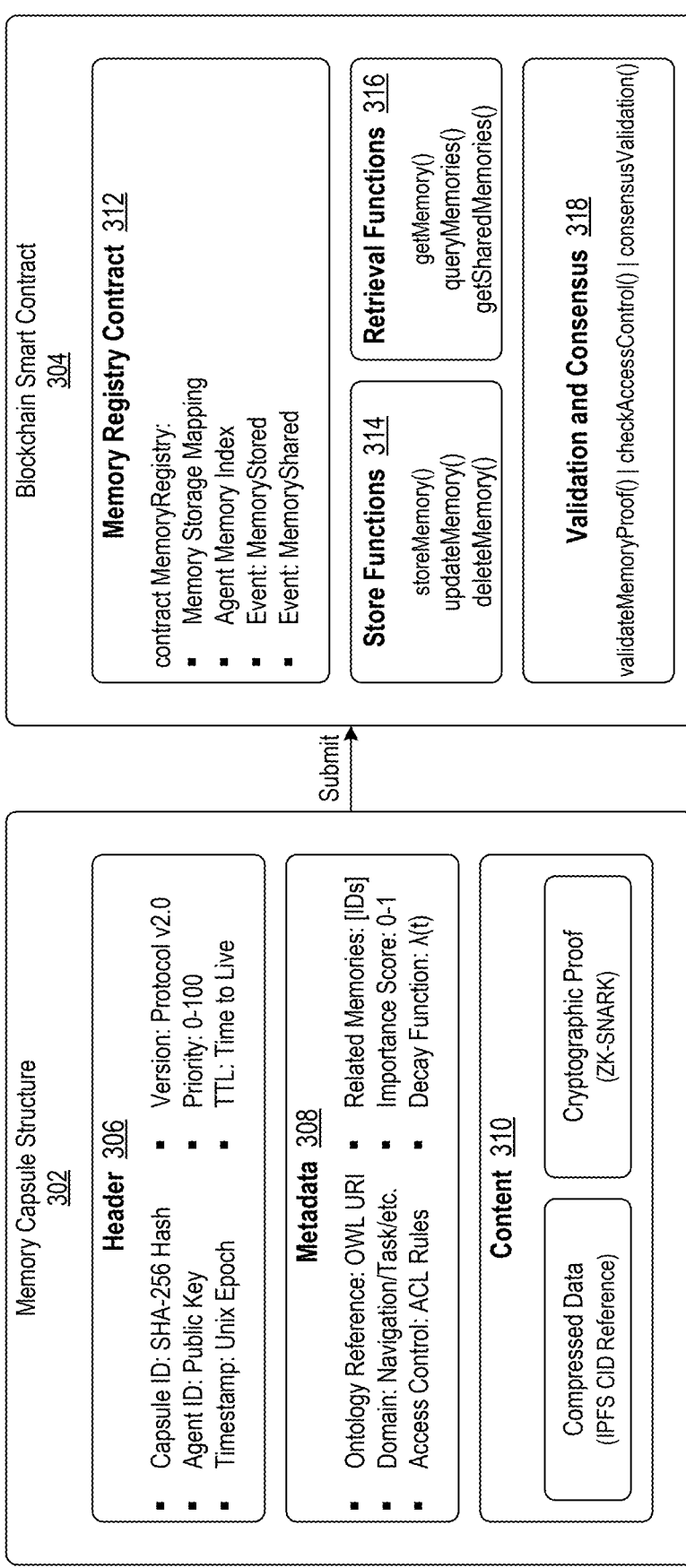
FIG. 3 shows a schematic illustrating an example environment of a memory capsule data structure constructed by an agent management platform and stored on a blockchain smart contract, in accordance with some implementations of the present technology.

FIG. 3 shows a schematic illustrating an example environment 300 of a memory capsule structure 302 constructed by an agent management platform and stored on a blockchain smart contract 304, in accordance with some implementations of the present technology. The environment 300 can be implemented using components of example computer system 1000 illustrated and described in more detail with reference to FIG. 10. Likewise, implementations of example environment 300 can include different and/or additional components or can be connected in different ways.

A memory capsule structure 302 can include a header 306, metadata 308, and content 310. The memory capsule structure 302 operates as a modular and extensible data container enabled to store agent memory in the distributed memory mesh. The header 306 can include fields such as a capsule ID (such as a SHA-256 hash for uniqueness and tamper resistance), an agent ID (e.g., a public key to verify provenance), timestamp (such as Unix epoch time for temporal ordering), protocol version, priority score (used for retrieval or process scheduling), and/or a TTL value to automate memory expiration and retention. In some implementations, the header 306 can include additional or alternate fields. The metadata 308 provides semantic context and can include ontological references that positions the memory within the hierarchical ontology (such as URIs or graph node indexes), domain classifications, access permissions (managed via access control lists or role-based tokens), and/or cryptographic proofs (e.g., digital signatures, zero-knowledge proof parameters). The metadata 308 can include dynamic attributes such as usage statistics, last access patterns, context similarity hashes, and so forth.

The content 310 includes a compressed or serialized representation of operational data (e.g., inputs, sensor readings, or learned model outputs). In some implementations, the content 310 embeds only a hash pointer to an external or off-chain storage location (e.g., IPFS or distributed object stores), while the capsule on-chain manages the access pathways. In some implementations, the content 310 is chunked for multi-part retrieval and/or include partitioned subfields (such as "summary," "raw input," "post-processed output") for multi-stage recall by agents. In some implementations, in environments where collective computation is required, the content 310 can include homomorphically encrypted statistics and/or collaborative memory aggregates.

The memory capsule structure 302 can be transmitted, indexed in the distributed network (e.g., blockchain network 102 in FIG. 1, the blockchain smart contract 304), and accessed or recalled in accordance with agent roles, domain queries, and/or time-sensitive retrieval constraints. When an agent produces a memory, the memory capsule is first encoded by serializing the defined header, metadata, and content fields into a unified digital object (e.g., the memory capsule structure 302). The content, if large or privacy-sensitive, can be stored in a distributed file system such as IPFS, with the memory capsule structure 302 storing a hash-based pointer to the actual location. The capsule is submitted to the network by invoking a storage function of the blockchain smart contract 304 (see blockchain network 102 in FIG. 1). The memory registry contract 312 registers the memory capsule structure 302, indexes the memory capsule structure 302 by agent identity, domain class, and/or related ontological features, and logs the registration event immutably on-chain. Store functions 314 provide authenticated endpoints for both adding and updating memory capsules, while retrieval functions 316 allow agents to perform queries-filtering by agent role, domain, relevant ontology, time of storage, or expiration (TTL).

When memory retrieval is required, an agent broadcasts a query with constraints such as a required domain ("Navigation"), an ontological pointer (e.g., "Location X"), and/or time sensitivity (such as priority for recent memories). The smart contract's logic validates the agent's request using permissions stored in the metadata (e.g., using ACLs) and can use a validation/consensus module 318 to ensure the requestor's identity/role and enforce current network consensus rules. If validation succeeds, the network returns the memory's on-chain metadata and off-chain content reference, filtered to only include results matching the query, agent's access level, and freshness requirements (e.g., with temporal relevance calculated using exponential decay functions).

Figure 4:
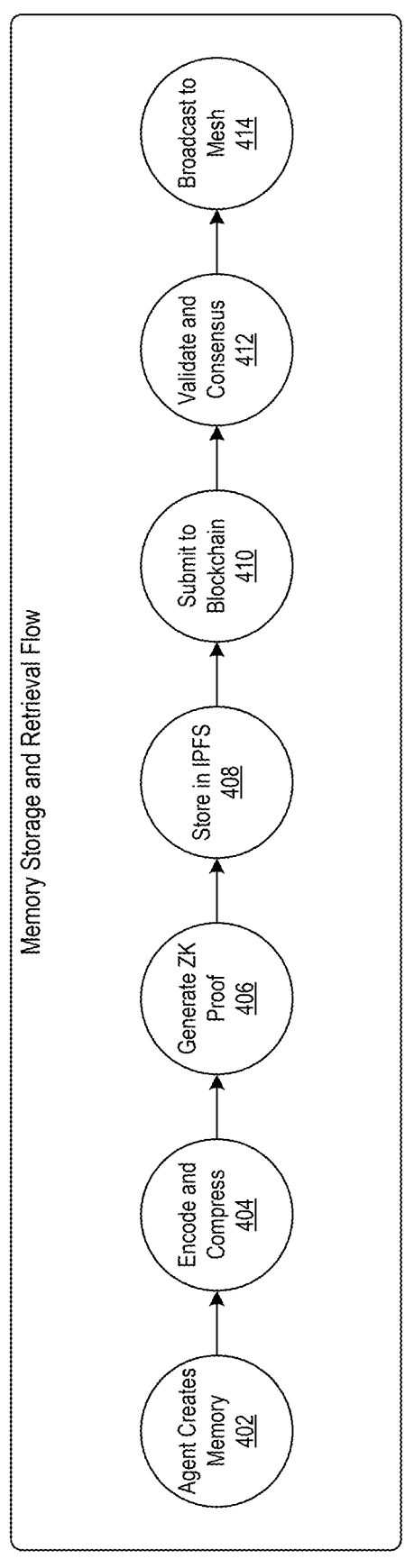
FIG. 4 is a flow diagram illustrating an example process of storing and retrieving agent memory using an agent management platform, in accordance with some implementations of the present technology.

FIG. 4 is a flow diagram illustrating an example process 400 of storing and retrieving agent memory using an agent management platform, in accordance with some implementations of the present technology. In some implementations, the process 400 is performed by a computer system, e.g., example computer system 1000 illustrated and described in more detail with reference to FIG. 10. Implementations can include different and/or additional operations or can perform the operations in different orders.

In operation 402, an agent creates a memory. The memory data includes internal state variables, environmental observations, task outcomes, API responses, sensor readings, and/or inter-agent messages. This data acquisition can be triggered automatically by specific events (such as task completion, state change, or receipt of external input) or periodically by monitoring systems embedded within the agent's architecture (as depicted in the agent memory store components, e.g., agents 104 in FIG. 1). After data capture, the agent transmits the data to the agent management platform, such as the hierarchical ontology engine 106 in FIG. 1. The agent management platform classifies the captured information and yields an ontological reference pointer, which operates as a structured label for the data.

In operation 404, the agent management platform encodes and/or compresses the memory created in operation 402. The agent management platform can generate a unique capsule ID (using a cryptographic hash of the serialized data), assign the agent ID, and populate operational fields such as timestamp, version, and priority. The agent management platform can add metadata, including ontological pointers, domain tags, access permissions, and any computed relevance scores or decay settings for temporal weighting. If privacy or verification is needed, a cryptographic proof (such as a zero-knowledge proof witness) can be generated by invoking the agent's cryptographic or privacy module (see the privacy module 110 in FIG. 1).

In some implementations, the encoding process compresses the content or substitutes references (such as pointers to off-chain storage), depending on the implementation's bandwidth and storage requirements. Once assembled, the resulting memory capsule can be stored locally in the agent's memory store, queued for network transmission, and/or passed directly to the storage operation for the distributed mesh.

In operation 406, the agent management platform (e.g., via the agent) generates the ZK proof of the encoded/compressed memory. The agent management platform isolates and/or otherwise identifies specific, structured metadata and selected operational parameters directly from the encoded/compressed memory. These isolated/identified values are assembled into a defined witness data structure that separates the attested fields from the actual memory data. The agent management platform applies a sequence of data transformation operations such as bitwise operations to the defined witness data structure to generate the ZK proof, i.e., a proof object. The ZK proof can be encoded in a deterministic binary format that enforces a property about the memory data (e.g., access privileges or timestamp constraints) without exposing disclosed contents.

In operation 408, the agent management platform (e.g., via the agent) stores the ZK proof generated in operation 406 on the IPFS by serializing it into a byte array or similar non-textual format. The agent management platform can transfer this byte array to a peer-to-peer storage node. Prior to transmission, a content digest (such as a hash) can be used as the storage address.

In operation 410, the agent management platform (e.g., via the same or different agent) submits the stored ZK proof to the blockchain. The message can include the content digest (storage address) and references to the corresponding memory capsule (using its unique digital identifier and metadata pointers). The message can be encoded (such as a binary or hexadecimal) and transmitted via the distributed ledger's gateway node. The transaction can be validated by participating nodes before being committed to the tamper-resistant ledger.

In operation 412, one or more validator agents participating on the blockchain validate the submitted proof. When a new proof reference is recorded, validator agents are triggered through an event-driven mechanism to initiate a networked fetch of the proof object from the distributed file storage using the recorded content address. The proof object and associated capsule metadata can be loaded into a local buffer, and a verification routine can be executed by determining relationships and properties of the ZK proof using only pre-defined steps and public input values. The routine can return a pass/fail signal, which is then transmitted through a signed message to the ledger network and updates the capsule's access and validation status using an explicit flag.

In operation 414, once validated, the memory capsule data structure is broadcasted to the agent mesh. Validated memory capsules can be indexed in a distributed table for the mesh network. Every authorized agent receives or can query the existence and details of the validated capsule.

Figure 5A:
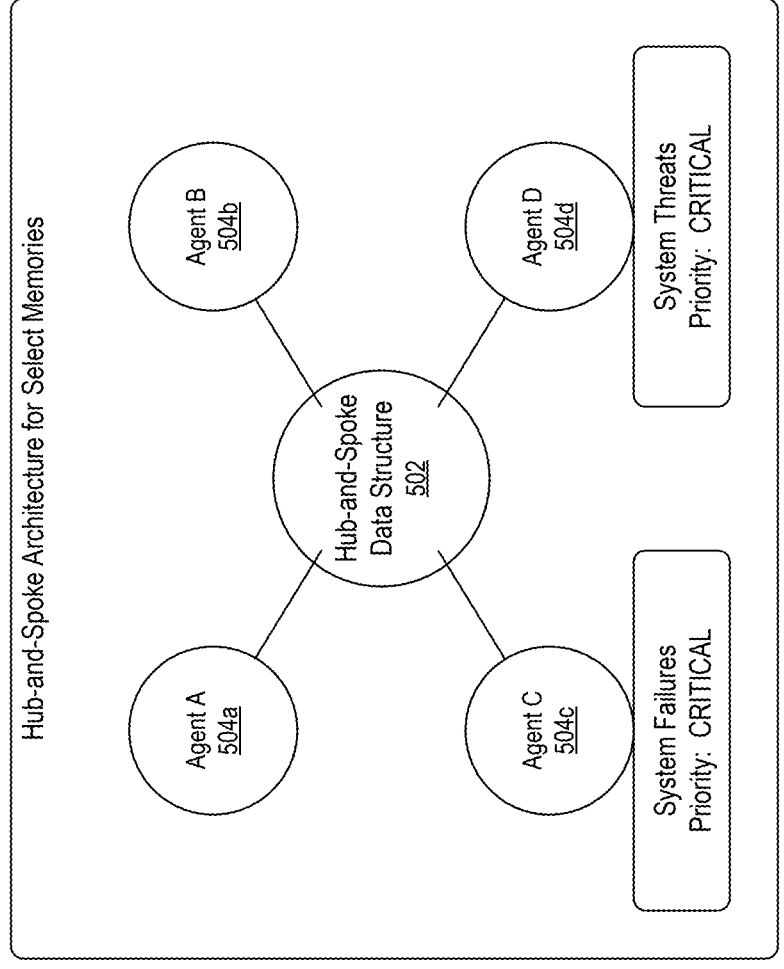
FIG. 5A shows a schematic illustrating an example environment of a hub-and-spoke data structure implemented by an agent management platform for select memories (e.g., high-priority memories), in accordance with some implementations of the present technology.

FIG. 5A shows a schematic illustrating a hub-and-spoke data structure implemented by an agent management platform for select memories (e.g., high-priority memories, system failures, security threats), in accordance with some implementations of the present technology.

The hub-and-spoke data structure 502 operates as a central hub that maintains always-available select memory stores. The hub-and-spoke data structure 502 operates as the authoritative source a set of directly linked spoke agents 504. The hub-and-spoke data structure 502 persistently maintains select memory stores that are classified as selected due to a predefined attribute, such as a category of operational importance. The memory hub aggregates memory capsules designated as selected. In some implementations, the memory hub operates as a high-availability node in a distributed ledger cluster, or as a redundant server cluster, to minimize or otherwise reduce retrieval latency under high-volume access scenarios.

In some implementations, spoke agents (e.g., a first AI agent 504A, a second AI agent 504B, a third AI agent 504C, a fourth AI agent 504D, and so forth) can receive alerts/ signals such as push notifications when select memories are stored or updated, thereby enabling near-real-time or real-time awareness of select memories such as system failures and security threats that require coordinated response across the agent network. The agent can trigger local adaptations, automated recovery routines, or initiate information sharing with subordinate agents in response to receiving the alert/ signal from the hub-and-spoke data structure 502. In some implementations, agents maintain a prioritized cache of the select memories received from the hub-and-spoke data structure 502.

Figure 5B:
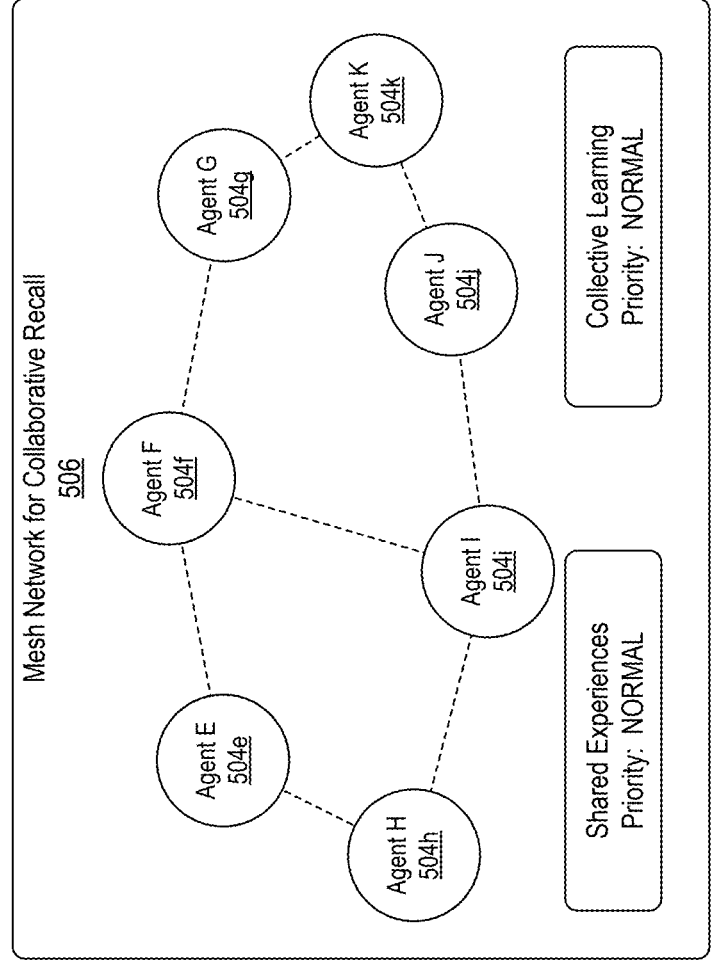
FIG. 5B shows a schematic illustrating an example environment of a mesh network structure implemented by an agent management platform for collaborative recall, in accordance with some implementations of the present technology.

FIG. 5B shows a schematic illustrating a mesh network structure implemented by an agent management platform for collaborative recall, in accordance with some implementations of the present technology.

The mesh network structure 506 enables peer-to-peer memory discovery using a distributed topology where agents can directly communicate and share memories without requiring centralized coordination. The peer-to-peer connections between agents such as a fifth agent 504e, a sixth agent 504f, a seventh agent 504g, a eighth agent 504h, a ninth agent 504i, a tenth agent 504j, and an eleventh agent 504k enable collaborative recall operations. For example, agents can use a distributed hash table (DHT) for memory discovery. The DHT assigns each memory capsule a unique hash-based identifier derived from the capsule's content or metadata, which is then mapped to specific agent nodes responsible for storing and serving that memory through consistent hashing algorithms such as Chord, Kademlia, or Pastry that distribute storage responsibilities evenly across participating agents. When an agent seeks to discover memories, the agent queries the DHT using the ontological reference pointer in the query, and the DHT routing protocol directs the query to the corresponding storage nodes (e.g., through logarithmic-time lookup operations that traverse the distributed hash space). In some implementations, multiple agents maintain copies of select memory capsules (e.g., frequently retrieved, high importance).

In some implementations, the agent management platform enables multi-hop routing with TTL constraints, which enables memory retrieval requests to traverse multiple intermediate agent nodes to reach the target memory location while preventing infinite routing loops and network congestion through TTL limitations. Multi-hop routing operates by enabling agents to forward memory queries through a sequence of intermediate nodes when direct communication paths are unavailable or inefficient (e.g., latency above a certain threshold). Each forwarding agent evaluates routing tables, network topology information, and proximity metrics to select next-hop destinations that minimize or otherwise reduce total path length and maximize or otherwise increase delivery probability. Each memory query packet can include a decreasing counter that is decremented at each forwarding hop, and when the TTL value reaches zero, the packet can be automatically discarded to prevent endless circulation through the network topology. The routing protocol can maintain distributed routing tables that track network topology changes, agent availability status, and path quality metrics.

The agent management platform can implement a gossip protocol for memory summary propagation. The gossip protocol operates by directing each agent to periodically select a random subset of peer agents from the network topology and exchange memory summaries containing compressed representations of recently created, modified, or accessed memory capsules, including ontological classifications, relevance scores, temporal metadata, and cryptographic fingerprints that enable other agents to evaluate memory relevance without accessing full content. The agent management platform can implement exponential information spread where each gossip round doubles or otherwise increases the number of informed agents, thereby achieving network-wide dissemination in, for example, a logarithmic time complexity relative to network size (e.g., log (N)). The agent management platform can use configurable parameters including gossip fanout to determine how many peers each agent contacts per round, gossip interval that specifies the time between propagation cycles, and message size limits that control bandwidth utilization. The memory summary propagation enables agents to maintain awareness of available memories across the network.

FIG. 6 is a flow diagram illustrating an example process 600 of selective synchronization of agent memories using an agent management platform, in accordance with some implementations of the present technology. The process 600 can be implemented using components of example computer system 1000 illustrated and described in more detail with reference to FIG. 10. Likewise, implementations of example process 600 can include different and/or additional components or can be connected in different ways.

In operation 602, the agent management platform generates a summary of the memory capsule data structure by extract features based on an ontological reference pointer of the memory capsule data structure. The agent management platform can determine a score (e.g., a relevance score) based on semantic distance. The agent management platform can generate, for example, descriptors (e.g., 256-bit compact descriptors) of the memory capsule data structure. In some implementations, the agent management platform generates bloom filters to increase the speed when matching. The Bloom filter uses multiple independent hash functions that map memory features to bit positions within a filter array, enabling agents to determine whether specific features are present in a memory capsule without requiring full descriptor comparison or content access.

In operation 604, to filter memory capsule data structures when retrieving the memory capsule data structures, the agent management platform can implement ontology-based matching using SPARQL (an Resource Description Framework (RDF) Query Language) queries. The agent management platform can determine context similarity between, for example, a query and the stored memory capsule data structures using cosine distance by translating natural language or structured queries into SPARQL graph patterns that specify desired relationships between memory capsules and ontological concepts. The agent management platform can perform graph traversal operations across the ontological structure to identify memory capsules that satisfy the specified semantic criteria.

The agent management platform determines context similarity between queries and stored memory capsule data structures using cosine distance calculations that measure the angular similarity between vector representations of query terms and memory content features within a normalized vector space. The cosine distance computation transforms both query parameters and memory capsule descriptors into numerical vectors using techniques such as term frequency-inverse document frequency (TF-IDF) weighting, word embeddings generated through Word2Vec or GloVe algorithms, or domain-specific feature extraction methods that capture semantic relationships within the ontological framework. The similarity calculation applies the cosine distance formula cos (0)=(A·B)/(‖A‖×‖B‖), where A represents the query vector, B represents the memory capsule vector, and the resulting cosine value ranges from −1 to 1, with values closer to 1 indicating higher semantic similarity and greater relevance for retrieval operations. In some implementations, the agent management platform incorporates advanced similarity measures such as Jaccard similarity for set-based comparisons.

In operation 606, the agent management platform requests the full memory capsule data structure only when relevance (e.g., the score) exceeds a threshold. The memory capsule data structures can be filtered based on a retrieval agent's role and/or granted permissions. The agent management platform can verify access permissions through smart contracts. The agent management platform can decrypt content using distributed key management. The relevance threshold operates as a configurable parameter can be used to balance retrieval precision against recall, where higher threshold values reduce false positive retrievals but increase the risk of missing relevant memories, while lower thresholds capture more potentially relevant memories at the cost of increased network traffic and processing overhead.

In operation 608, the memory capsule data structures can be temporally weighted (e.g., weight=e^(−λt)), as discussed in further detail with reference to FIG. 1. The agent management platform can cache locally with TTL-based expiration.

FIG. 7 shows a schematic illustrating an example environment 700 of sharing agent memories while preserving privacy using an agent management platform, in accordance with some implementations of the present technology. The environment 700 can be implemented using components of example computer system 1000 illustrated and described in more detail with reference to FIG. 10. Likewise, implementations of example environment 700 can include different and/or additional components or can be connected in different ways.

A ZK proof engine 702 can generate proving and verification keys (e.g., (pk, vk)) of agent memory properties. A prover agent 704 requesting to store the memory can generate a proof (e.g., π=Prove (pk, memory, witness)). The proving key enables the prover agent 704 to construct a proof (e.g., a mathematical proof) that attests to a specific attribute of the agent's memory, such as its creation time, domain linkage, or compliance with network policies, without exposing any of the underlying operational content. The prover agent 704 uses the proving key, the raw memory data, and associated witness information (such as concealed values or contextual tags) to generate a digital artifact (the proof π). Once generated, IT can be shared with other agents, such as a verifier agent 706. Other agents (e.g., a verifier agent 706) within the distributed network can verify the proof (e.g., Verify (vk, π, public_inputs)=true). The verification agent uses the verification key and public statements (such as memory capsule metadata or declared context) to confirm that the proof is valid.

Among cryptographic components 708 in the agent management platform, a ZK-SNARK circuit 710 that validates, without operational data disclosure, memory age and freshness, a degree of relevance to specific domains, compliance with security policies, presence of required attributes, consistency with previous memories, and so forth. The ZK-SNARK circuit 710 enforces validation that does not directly reveal operational data, yet confirms the memory's properties. For example, the ZK-SNARK circuit can confirm that a memory comes from an agent that satisfies a set of criteria (e.g., that it fits within a permitted temporal window, or that it belongs to a designated task class), without revealing the agent's memory data or the agent's private keys.

Pederson commitments or other commitment schemes can be used in an commitment scheme 712 of the cryptographic components 708. Commitment schemes allow an agent to "lock down" a value, such as a certain memory field, timestamp, or policy tag, before the proof is fully developed. A commitment results in a cryptographic placeholder that can later be opened to reveal the committed value, or used as part of the zero-knowledge protocol to prove properties about the value. When an agent computes a designated field for commitment, such as a memory hash, timestamp, or a policy attribute, the agent applies an operation (e.g., a data transformation) defined in the commitment protocol. The agent combines the actual value (for instance, the hash of the memory content) with a randomly generated blinding factor. This yields a fixed-size cryptographic commitment. Only the agent knows both the original value and the randomizer, while all other parties (e.g., other agents) see only the commitment. The agent transmits this commitment (rather than the value or the randomizer) to one or more cryptographic components 708 of the agent management platform, where the cryptographic components 708 store the commitment alongside metadata linking it to the relevant memory capsule identifier and the agent's operational context. In the subsequent stages, such as the execution of a zero-knowledge proof protocol, the agent references the previously submitted commitment in the formation of the proof. If later desired, the agent can "open" the commitment by supplying both the original value and the blinding factor to the cryptographic components 708 or to network validators to recompute the commitment from the revealed data and match it to the original commitment stored earlier.

In some implementations, a commitment scheme 712 based on the outlined protocol supports batch processing, where multiple commitments—corresponding to, for example, sets of memory fields or a time series of policy attributes—are generated and relayed together for network efficiency. The network can thus validate a series of memory interactions using the same underlying cryptographic mechanics but with a single, compact reference. The separation of commitment and reveal stages enables the agent management platform to coordinate privacy, access policy, and memory attestation without exposing any committed value until explicit protocol requirements mandate disclosure under tightly controlled conditions.

The cryptographic components 708 of the agent management platform enable, for example, homomorphic encryption 714 for collective memories. For example, agents can combine encrypted memories and compute aggregate statistics without decryption, thereby generating collective memories while preserving individual privacy. Homomorphic encryption enables multiple encrypted data items, such as agent memories or their derived statistics, to be combined, accumulated, or processed without revealing individual plaintext values. For example, multiple agents can encrypt their private memory statistics, and the platform can compute an aggregate (such as a sum or average) while the data remain encrypted at all stages. Only an agent or auditor holding the proper decryption key can later decrypt the final result, ensuring that the process of building collective memory statistics or summaries does not expose the protected original memories of individual agents, thereby preserving privacy throughout collaborative computation workflows such as multi-party computation (MPC).

FIG. 8 is a flow diagram illustrating an example process 800 of maintaining agent memory of AI agents using an agent management platform, in accordance with some implementations of the present technology. In some implementations, the process 800 is performed by a computer system, e.g., example computer system 1000 illustrated and described in more detail with reference to FIG. 10. Implementations can include different and/or additional operations or can perform the operations in different orders.

In operation 802, the agent management platform can receive (e.g., obtain, access, determine), from a requestor autonomous AI agent that operates on a computing device, a memory storage request to store operational data (e.g., information about the agent's current situation, environment, or internal processes, which is used to determine its next actions) of the requestor autonomous AI agent. The operational data can include a token set that defines one or more operational state variables for one or more tasks historically executed by the requestor autonomous AI agent. For example, the requesting agent assembles a packet of operational data that describes its environmental context, or internal state variables associated with previously executed or ongoing tasks. The token set refers to a digitally encoded representation of one or more operational state variables, each mapped to tasks historically or currently being executed by the agent.

In operation 804, the agent management platform can classify the operational data using a hierarchical ontological data structure (e.g., the knowledge representation structure discussed with reference to FIG. 2) that organizes a predefined taxonomic node set associated with the requestor autonomous AI agent into multiple tiers. For example, the agent management platform can map the operational data to a subset of the predefined taxonomic node set using a distance between a vector representation of at least a portion of the operational data with a vector representation of each taxonomic node of the predefined taxonomic node set. The agent management platform can generate (e.g., determine, identify) an ontological reference pointer (e.g., a memory instance organized by the domain and concept layers) for the operational data that defines a position of the taxonomic node subset within the hierarchal ontological data structure. In some implementations, the position of the taxonomic node subset is represented using one or more directed graph connections within the hierarchical ontological data structure that links the taxonomic node subset to a higher-level taxonomic node positioned in a higher tier than the taxonomic node subset within the hierarchical ontological data structure and/or a lower-level taxonomic node positioned in a lower tier than the taxonomic node subset within hierarchical ontological data structure.

In some implementations, the hierarchical ontological data structure (e.g., the hierarchal ontology engine 106 in FIG. 1) is represented in accordance with OWL, as discussed in further detail with reference to FIG. 2. For example, the OWL standards provide multi-level knowledge representation across domain, concept, and instance layers. The ontological reference pointer can define the position of the taxonomic node subset within an instance layer of the hierarchal ontological data structure.

In operation 806, the agent management platform can construct (e.g., determine, identify, generate) a memory capsule data structure (e.g., to be stored in a blockchain smart contract) that compresses the operational data by substituting one or more tokens of the operational data with a representation of the ontological reference pointer. The memory capsule data structure can include temporal metadata associated with the operational data, the ontological reference pointer, and/or a cryptographic proof configured to verify the requestor autonomous AI agent within the distributed network.

The memory capsule data structure can include a header data block that includes unique capsule identifier and/or a protocol version number, a metadata data block that includes the ontological reference pointer and/or temporal metadata associated with the operational data, and/or a compressed content data block that includes the operational data compressed using the representation of the ontological reference pointer.

In operation 808, the agent management platform can generate (e.g., determine, identify) a unique blockchain transaction identifier for the memory capsule data structure by applying a cryptographic hash operation to a concatenated representation of the memory capsule data structure. To preserve privacy of agents during memory sharing, the agents can use zero-knowledge proofs that enable the agents to validate memory properties without revealing actual operational data. For example, the agent management platform can generate a zero-knowledge cryptographic proof for the memory capsule data structure. The agent management platform can receive, from a verifying autonomous AI agent of the multiple autonomous AI agents, a validation request that includes verification parameter set, and transmit, to the verifying autonomous AI agent, the zero-knowledge cryptographic proof, where the zero-knowledge cryptographic proof is configured to validate the verification parameter set against the memory capsule data structure.

In operation 810, the agent management platform can store the memory capsule data structure in a distributed network accessible to multiple autonomous AI agents that include the requestor autonomous AI agent. Each autonomous AI agent can be represented by a corresponding computing device (e.g., a blockchain node) that participates in the distributed network. The memory capsule data structure can be stored by broadcasting the unique blockchain transaction identifier to each computing device. The agent management platform can implement off-chain storage of the memory capsule data structure with on-chain references. For example, the agent management platform can store metadata references that identify the memory capsule data structure in a blockchain transaction, and store the memory capsule data structure in an off-chain distributed storage.

In some implementations, the agent management platform can encrypt the operational data within the memory capsule data structure prior to storing the memory capsule data structure in the distributed network. In some implementations, a single cryptographic key is used for both encryption and decryption operations. For example, the symmetric encryption operates by transforming the plaintext operational data through mathematical operations that substitute and permute data bits according to the encryption key, creating ciphertext that appears as random data to unauthorized observers while preserving the ability to reverse the transformation when the correct key is applied. The agent management platform can determine an encryption key (depending on the method of encryption) associated with the requestor autonomous AI agent, and store the encryption key in a distributed database. The distributed database can split the encryption key into multiple fragments distributed across different nodes in the network, where each fragment contains insufficient information to reconstruct the original key independently, but a predetermined threshold number of fragments can be combined to recover the complete encryption key. Using the retrieval autonomous AI agent, the agent management platform can reconstruct the encryption key and decrypt the operational data. For example, the agent management platform can implement a multi-party computation protocol where the retrieving agent presents cryptographic credentials and access permissions to the key share holders, who validate the agent's authorization through digital signature verification and access control evaluation before releasing their respective key shares.

The agent management platform can coordinate a distributed cache when storing the memory capsule data structure by determining an access pattern set of the requestor autonomous AI agent that identifies one or more taxonomic node subsets accessed beyond a threshold value and replicating one or more memory capsule data structures associated with the one or more taxonomic node subsets across multiple computing devices in the distributed network.

Dictionary coding can be used to generate a memory summary compression of the operational data. For example, the agent management platform can generate a compressed memory summary using the ontological reference pointer as a compression dictionary. The agent management platform can store the compressed memory summary in the memory capsule data structure.

To enable horizontal scaling, the agent management platform can implement blockchain sharding. In some implementations, the agent management platform can partition the distributed network into multiple blockchain shards based on the ontological data structure. The agent management platform can distribute multiple memory capsule data structures across the multiple blockchain shards in accordance with a respective ontological reference pointer of each memory capsule data structure.

To retrieve an agent's memory by a different agent, where the memory capsule data structure is a first memory capsule data structure, the agent management platform can receive, from a retrieval autonomous AI agent, a memory retrieval request to retrieve a particular memory capsule data structure that satisfies a similarity threshold value with an ontological parameter set. The agent management platform can identify one or more memory capsule data structures stored in the distributed network that match the ontological parameter set by comparing the similarity threshold value against a distance between a vector representation of the ontological parameter set and a vector representation of the stored one or more memory capsule data structures. The agent management platform can transmit, to the retrieval autonomous AI agent, a representation of the one or more memory capsule data structures.

As further discussed with reference to FIG. 6, agents can share only relevant memory summaries, with full memory content fetched on-demand based on relevance scores and access permissions. For example, the agent management platform can receive, from a retrieval autonomous AI agent, a memory retrieval request to retrieve a particular memory capsule data structure that satisfies a similarity threshold value with an ontological parameter set. The agent management platform can generate a memory summary representation for each memory capsule data structure stored in the distributed network. The agent management platform can compare each memory summary representation against the ontological parameter set to generate a score for the memory summary representation. The agent management platform can transmit, to the retrieval autonomous AI agent, one of more memory capsule data structures associated with a score that exceeds the similarity threshold value.

As further discussed with reference to FIGS. 5A and 5B, the agent management platform can combine hub-and-spoke architectures for select (e.g., critical) memories with mesh networking structures for collaborative recall. The hybrid approach ensures rapid propagation of high-priority memories while enabling efficient peer-to-peer sharing for routine information. For example, where the computing device is a first computing device, the agent management platform can identify a priority classification for the memory capsule data structure based on the taxonomic node subset. In response to the priority classification satisfying a particular value, the agent management platform can transmit the memory capsule data structure to a second computing device that is configured to broadcast the memory capsule data structure to multiple computing devices communicatively connected to the second computing device.

Retrieval of memory capsule data structures can be temporally weighted (e.g., time-based priority). For example, the agent management platform can assign a temporal weight value to the memory capsule data structure based on a time elapsed since creation of the operational data. The agent management platform can apply an exponential decay function to the temporal weight value to generate a temporal score for the memory capsule data structure. The agent management platform can modify a priority score of the memory capsule data structure based on the temporal score, wherein the priority score is used to retrieve the memory capsule data structure.

The agent management platform can maintain a least-recently-used cache of memory capsule data structures accessed by a retrieval autonomous AI agent within the multiple autonomous AI agents for, for example, frequently accessed memories. In some implementations, the agent management platform is enabled to predictively pre-fetch memories based on access patterns. For example, using the least-recently-used cache, the agent management platform can determine an access pattern set of the requestor autonomous AI agent that identifies one or more taxonomic node subsets accessed beyond a threshold value. The agent management platform can retrieve one or more memory capsule data structures associated with the one or more taxonomic node subsets.

The agent management platform can batch process multiple memory retrieval requests. For example, the agent management platform can receive multiple memory retrieval requests for different memory capsule data structures from a retrieval autonomous AI agent within the multiple autonomous AI agents. The agent management platform can batch the multiple memory retrieval requests into a single network transmission that includes representations of the different memory capsule data structures. The agent management platform can transmit the single network transmission to the retrieval autonomous AI agent.

Large memory sets can be progressively synchronized. For example, the agent management platform can receive multiple memory retrieval requests for different memory capsule data structures from a retrieval autonomous AI agent within the multiple autonomous AI agents. The agent management platform can group the different memory capsule data structures into multiple batch transmissions. The agent management platform can synchronize the multiple batch transmissions across the multiple autonomous AI agents in multiple phases.

The agent management platform can adaptively route data (e.g., operational data, the memory capsule data structure(s)) based on different network conditions. For example, the agent management platform can obtain a network topology state between multiple computing devices in the distributed network. The agent management platform can select a routing path for transmission of a particular memory capsule data structure between the multiple computing devices based on the network topology state.

Example Implementation of the Models of the Agent Management Platform

Figure 9:
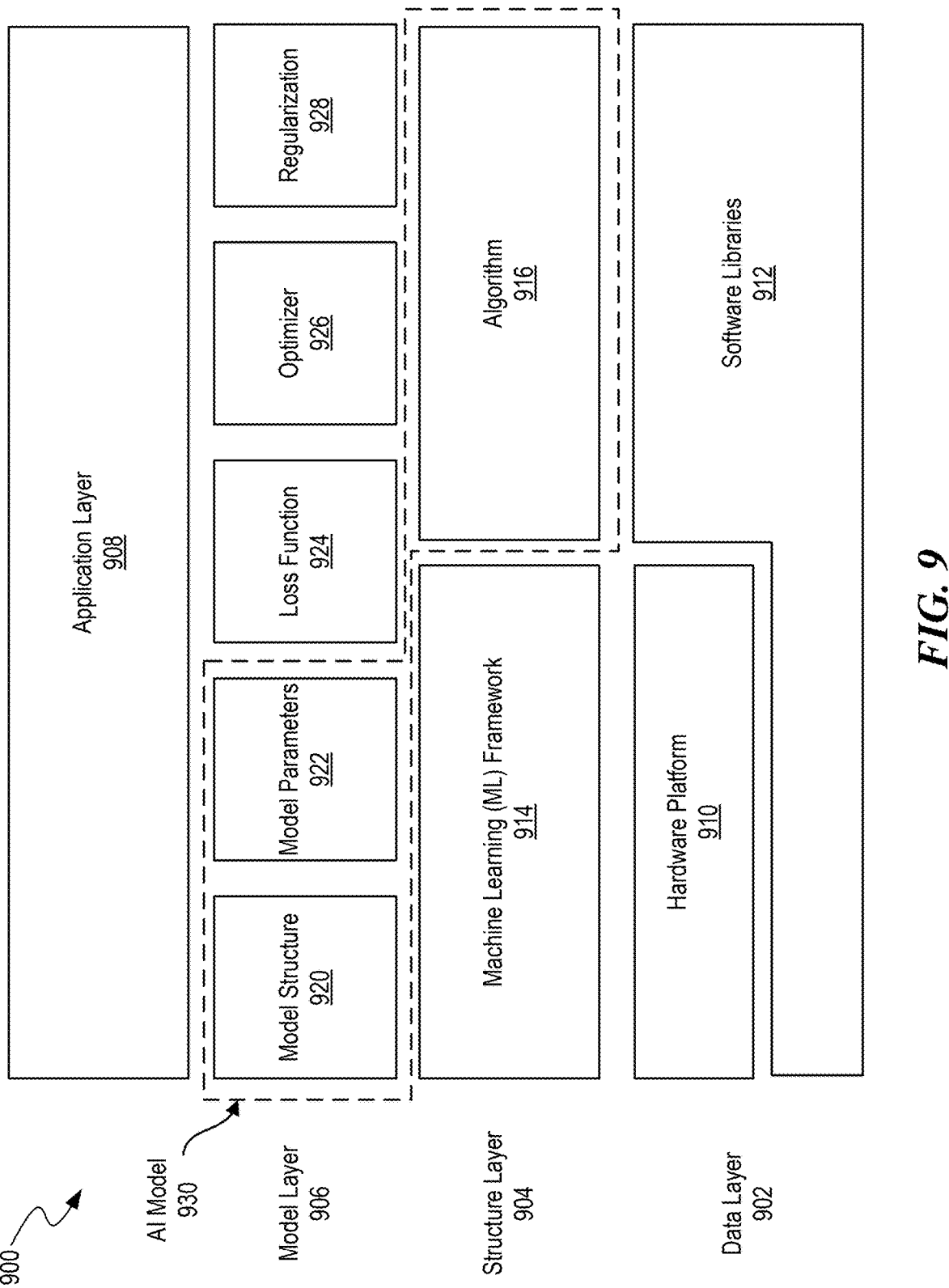
FIG. 9 illustrates a layered architecture of an AI system that can implement the machine learning models of an agent management platform, in accordance with some implementations of the present technology.

FIG. 9 illustrates a layered architecture of an AI system 900 that can implement the ML models of the agent management platform described with reference to FIGS. 1-8, in accordance with some implementations of the present technology. Example ML models can include the models executed by the agent management platform, such as agents 104. Accordingly, the agents 104 can include one or more components of the AI system 900.

As shown, the AI system 900 can include a set of layers, which conceptually organize elements within an example network topology for the AI system's architecture to implement a particular AI model. Generally, an AI model is a computer-executable program implemented by the AI system 900 that analyses data to make predictions. Information can pass through each layer of the AI system 900 to generate outputs for the AI model. The layers can include a data layer 902, a structure layer 904, a model layer 906, and an application layer 908. The algorithm 916 of the structure layer 904 and the model structure 920 and model parameters 922 of the model layer 906 together form an example AI model. The optimizer 926, loss function engine 924, and regularization engine 928 work to refine and optimize the AI model, and the data layer 902 provides resources and support for application of the AI model by the application layer 908.

The data layer 902 acts as the foundation of the AI system 900 by preparing data for the AI model. As shown, the data layer 902 can include two sub-layers: a hardware platform 910 and one or more software libraries 912. The hardware platform 910 can be designed to perform operations for the AI model and include computing resources for storage, memory, logic and networking, such as the resources described in relation to FIGS. 10 and 11. The hardware platform 910 can process amounts of data using one or more servers. The servers can perform backend operations such as matrix calculations, parallel calculations, machine learning (ML) training, and the like. Examples of servers used by the hardware platform 910 include central processing units (CPUs) and graphics processing units (GPUs). CPUs are electronic circuitry designed to execute instructions for computer programs, such as arithmetic, logic, controlling, and input/output (I/O) operations, and can be implemented on integrated circuit (IC) microprocessors. GPUs are electric circuits that were originally designed for graphics manipulation and output but may be used for AI applications due to their vast computing and memory resources. GPUs use a parallel structure that generally makes their processing more efficient than that of CPUs. In some instances, the hardware platform 910 can include computing resources, (e.g., servers, memory, etc.) offered by a cloud services provider. The hardware platform 910 can also include computer memory for storing data about the AI model, application of the AI model, and training data for the AI model. The computer memory can be a form of random-access memory (RAM), such as dynamic RAM, static RAM, and non-volatile RAM.

The software libraries 912 can be thought of suites of data and programming code, including executables, used to control the computing resources of the hardware platform 910. The programming code can include low-level primitives (e.g., fundamental language elements) that form the foundation of one or more low-level programming languages, such that servers of the hardware platform 910 can use the low-level primitives to carry out specific operations. The low-level programming languages do not require much, if any, abstraction from a computing resource's instruction set architecture, enabling them to run quickly with a small memory footprint. Examples of software libraries 912 that can be included in the AI system 900 include INTEL Math Kernel Library, NVIDIA cuDNN, EIGEN, and OpenBLAS.

The structure layer 904 can include an ML framework 914 and an algorithm 916. The ML framework 914 can be thought of as an interface, library, or tool that enables users to build and deploy the AI model. The ML framework 914 can include an open-source library, an API, a gradient-boosting library, an ensemble method, and/or a deep learning toolkit that work with the layers of the AI system facilitate development of the AI model. For example, the ML framework 914 can distribute processes for application or training of the AI model across multiple resources in the hardware platform 910. The ML framework 914 can also include a set of pre-built components that have the functionality to implement and train the AI model and enable users to use pre-built functions and classes to construct and train the AI model. Thus, the ML framework 914 can be used to facilitate data engineering, development, hyperparameter tuning, testing, and training for the AI model. Examples of ML frameworks 914 that can be used in the AI system 900 include TENSORFLOW, PYTORCH, SCIKIT-LEARN, KERAS, LightGBM, RANDOM FOREST, and AMAZON WEB SERVICES.

The algorithm 916 can be an organized set of computer-executable operations used to generate output data from a set of input data and can be described using pseudocode. The algorithm 916 can include complex code that enables the computing resources to learn from new input data and create new/modified outputs based on what was learned. In some implementations, the algorithm 916 can build the AI model through being trained while running computing resources of the hardware platform 910. This training enables the algorithm 916 to make predictions or decisions without being explicitly programmed to do so. Once trained, the algorithm 916 can run at the computing resources as part of the AI model to make predictions or decisions, improve computing resource performance, or perform tasks. The algorithm 916 can be trained using supervised learning, unsupervised learning, semi-supervised learning, and/or reinforcement learning.

Using supervised learning, the algorithm 916 can be trained to learn patterns (e.g., map input data to output data) based on labeled training data. The training data may be labeled by an external user or operator. For instance, a user may collect a set of training data, such as by capturing data from sensors, images from a camera, outputs from a model, and the like. In an example implementation, training data can include native-format data collected (e.g., in the form of operational data in FIG. 1) from various source computing systems described in relation to FIG. 9. Furthermore, training data can include pre-processed data generated by various engines of the agent management platform described in relation to FIG. 9. The user may label the training data based on one or more classes and trains the AI model by inputting the training data to the algorithm 916. The algorithm determines how to label the new data based on the labeled training data. The user can facilitate collection, labeling, and/or input via the ML framework 914. In some instances, the user may convert the training data to a set of feature vectors for input to the algorithm 916. Once trained, the user can test the algorithm 916 on new data to determine if the algorithm 916 is predicting accurate labels for the new data. For example, the user can use cross-validation methods to test the accuracy of the algorithm 916 and retrain the algorithm 916 on new training data if the results of the cross-validation are below an accuracy threshold.

Supervised learning can include classification and/or regression. Classification techniques include teaching the algorithm 916 to identify a category of new observations based on training data and are used when input data for the algorithm 916 is discrete. Said differently, when learning through classification techniques, the algorithm 916 receives training data labeled with categories (e.g., classes) and determines how features observed in the training data (e.g., various claim elements, policy identifiers, tokens extracted from unstructured data) relate to the categories (e.g., risk propensity categories, claim leakage propensity categories, complaint propensity categories). Once trained, the algorithm 916 can categorize new data by analyzing the new data for features that map to the categories. Examples of classification techniques include boosting, decision tree learning, genetic programming, learning vector quantization, k-nearest neighbor (k-NN) algorithm, and statistical classification.

Regression techniques include estimating relationships between independent and dependent variables and are used when input data to the algorithm 916 is continuous. Regression techniques can be used to train the algorithm 916 to predict or forecast relationships between variables. To train the algorithm 916 using regression techniques, a user can select a regression method for estimating the parameters of the model. The user collects and labels training data that is input to the algorithm 916 such that the algorithm 916 is trained to understand the relationship between data features and the dependent variable(s). Once trained, the algorithm 916 can predict missing historic data or future outcomes based on input data. Examples of regression methods include linear regression, multiple linear regression, logistic regression, regression tree analysis, least squares method, and gradient descent. In an example implementation, regression techniques can be used, for example, to estimate and fill-in missing data for machine learning based pre-processing operations.

Under unsupervised learning, the algorithm 916 learns patterns from unlabeled training data. In particular, the algorithm 916 is trained to learn hidden patterns and insights of input data, which can be used for data exploration or for generating new data. Here, the algorithm 916 does not have a predefined output, unlike the labels output when the algorithm 916 is trained using supervised learning. Said another way, unsupervised learning is used to train the algorithm 916 to find an underlying structure of a set of data, group the data according to similarities, and represent that set of data in a compressed format. The agent management platform can use unsupervised learning to identify patterns in claim history (e.g., to identify particular event sequences) and so forth. In some implementations, performance of the agent management platform that can use unsupervised learning is improved because the incoming memories (e.g., operational data in FIG. 1) is pre-processed and reduced, based on the relevant triggers, as described herein.

A few techniques can be used in unsupervised learning: clustering, anomaly detection, and techniques for learning latent variable models. Clustering techniques include grouping data into different clusters that include similar data, such that other clusters contain dissimilar data. For example, during clustering, data with possible similarities remain in a group that has less or no similarities to another group. Examples of clustering techniques include density-based methods, hierarchical based methods, partitioning methods, and grid-based methods. In one example, the algorithm 916 may be trained to be a k-means clustering algorithm, which partitions n observations in k clusters such that each observation belongs to the cluster with the nearest mean serving as a prototype of the cluster. Anomaly detection techniques are used to detect previously unseen rare objects or events represented in data without prior knowledge of these objects or events. Anomalies can include data that occur rarely in a set, a deviation from other observations, outliers that are inconsistent with the rest of the data, patterns that do not conform to well-defined normal behavior, and the like. When using anomaly detection techniques, the algorithm 916 may be trained to be an Isolation Forest, local outlier factor (LOF) algorithm, or K-nearest neighbor (k-NN) algorithm. Latent variable techniques include relating observable variables to a set of latent variables. These techniques assume that the observable variables are the result of an individual's position on the latent variables and that the observable variables have nothing in common after controlling for the latent variables. Examples of latent variable techniques that may be used by the algorithm 916 include factor analysis, item response theory, latent profile analysis, and latent class analysis.

The model layer 906 implements the AI model using data from the data layer and the algorithm 916 and ML framework 914 from the structure layer 904, thus enabling decision-making capabilities of the AI system 900. The model layer 906 includes a model structure 920, model parameters 922, a loss function engine 924, an optimizer 926, and a regularization engine 928.

The model structure 920 describes the architecture of the AI model of the AI system 900. The model structure 920 defines the complexity of the pattern/relationship that the AI model expresses. Examples of structures that can be used as the model structure 920 include decision trees, support vector machines, regression analyses, Bayesian networks, Gaussian processes, genetic algorithms, and artificial neural networks (or, simply, neural networks). The model structure 920 can include a number of structure layers, a number of nodes (or neurons) at each structure layer, and activation functions of each node. Each node's activation function defines how the node converts data received to data output. The structure layers may include an input layer of nodes that receive input data, an output layer of nodes that produce output data. The model structure 920 may include one or more hidden layers of nodes between the input and output layers. The model structure 920 can be an Artificial Neural Network (or, simply, neural network) that connects the nodes in the structured layers such that the nodes are interconnected. Examples of neural networks include Feed-forward Neural Networks, convolutional neural networks (CNNs), Recurrent Neural Networks (RNNs), Autoencoder, and Generative Adversarial Networks (GANs).

The model parameters 922 represent the relationships learned during training and can be used to make predictions and decisions based on input data. The model parameters 922 can weight and bias the nodes and connections of the model structure 920. For instance, when the model structure 920 is a neural network, the model parameters 922 can weight and bias the nodes in each layer of the neural networks, such that the weights determine the strength of the nodes and the biases determine the thresholds for the activation functions of each node. The model parameters 922, in conjunction with the activation functions of the nodes, determine how input data is transformed into desired outputs. The model parameters 922 can be determined and/or altered during training of the algorithm 916.

The loss function engine 924 can determine a loss function, which is a metric used to evaluate the AI model's performance during training. For instance, the loss function engine 924 can measure the difference between a predicted output of the AI model and the actual output of the AI model and is used to guide optimization of the AI model during training to minimize the loss function. The loss function may be presented via the ML framework 914, such that a user can determine whether to retrain or otherwise alter the algorithm 916 if the loss function is over a threshold. In some instances, the algorithm 916 can be retrained automatically if the loss function is over the threshold. Examples of loss functions include a binary-cross entropy function, hinge loss function, regression loss function (e.g., mean square error, quadratic loss, etc.), mean absolute error function, smooth mean absolute error function, log-cosh loss function, and quantile loss function.

The optimizer 926 adjusts the model parameters 922 to minimize the loss function during training of the algorithm 916. In other words, the optimizer 926 uses the loss function generated by the loss function engine 924 as a guide to determine what model parameters lead to the most accurate AI model. Examples of optimizers include Gradient Descent (GD), Adaptive Gradient Algorithm (AdaGrad), Adaptive Moment Estimation (Adam), Root Mean Square Propagation (RMSprop), Radial Base Function (RBF) and Limited-memory BFGS (L-BFGS). The type of optimizer 926 used may be determined based on the type of model structure 920 and the size of data and the computing resources available in the data layer 902.

The regularization engine 928 executes regularization operations. Regularization is a technique that prevents over- and under-fitting of the AI model. Overfitting occurs when the algorithm 916 is overly complex and too adapted to the training data, which can result in poor performance of the AI model. Underfitting occurs when the algorithm 916 is unable to recognize even basic patterns from the training data such that it cannot perform well on training data or on validation data. The optimizer 926 can apply one or more regularization techniques to fit the algorithm 916 to the training data properly, which helps constraint the resulting AI model and improves its ability for generalized application. Examples of regularization techniques include lasso (L1) regularization, ridge (L2) regularization, and elastic (L1 and L2 regularization).

The application layer 908 describes how the AI system 900 is used to solve problem or perform tasks. In an example implementation, the application layer 908 can include a front-end user interface of the agent management platform.

Example Computing Environment of the Agent
Management Platform

Figure 10:
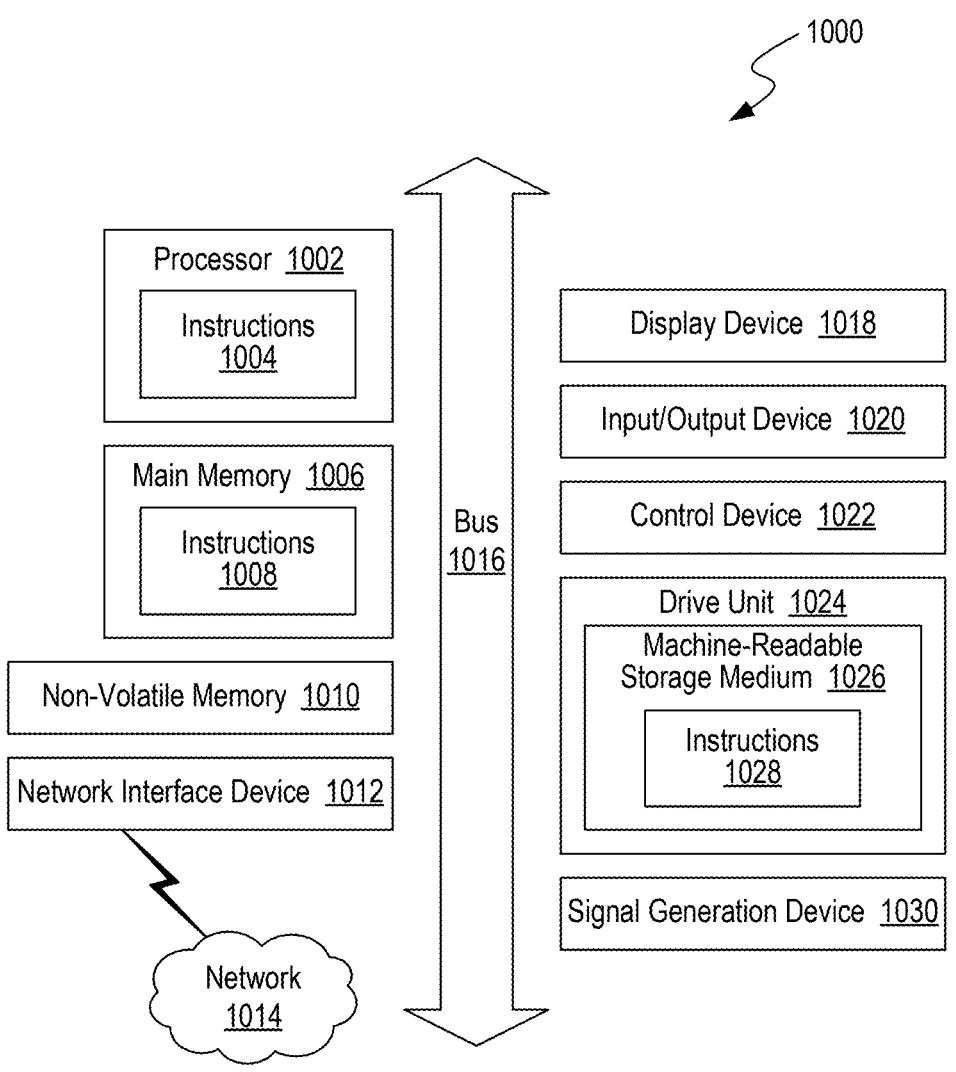
FIG. 10 is a block diagram showing some of the components typically incorporated in at least some of the computer systems and other devices on which the agent management platform operates, in accordance with some implementations of the present technology.

FIG. 10 is a block diagram showing some of the components typically incorporated in at least some of the computer systems 1000 and other devices on which the disclosed system operates in accordance with some implementations of the present technology. As shown, an example computer system 1000 can include: one or more processors 1002, main memory 1006, non-volatile memory 1010, a network interface device 1012, video display device 1018, an input/output device 1020, a control device 1022 (e.g., keyboard and pointing device), a drive unit 1024 that includes a machine-readable medium 1026, and a signal generation device 1030 that are communicatively connected to a bus 1016. The bus

1016 represents one or more physical buses and/or point-to-point connections that are connected by appropriate bridges, adapters, or controllers. Various common components (e.g., cache memory) are omitted from FIG. 10 for brevity. Instead, the computer system 1000 is intended to illustrate a hardware device on which components illustrated or described relative to the examples of the figures and any other components described in this specification can be implemented.

The computer system 1000 can take any suitable physical form. For example, the computer system 1000 can share a similar architecture to that of a server computer, personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computer system 1000. In some implementations, the computer system 1000 can be an embedded computer system, a system-on-chip (SOC), a single-board computer system (SBC) or a distributed system such as a mesh of computer systems or include one or more cloud components in one or more networks. Where appropriate, one or more computer systems 1000 can perform operations in real time, near real time, or in batch mode.

The network interface device 1012 enables the computer system 1000 to exchange data in a network 1014 with an entity that is external to the computing system 1000 through any communication protocol supported by the computer system 1000 and the external entity. Examples of the network interface device 1012 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 1006, non-volatile memory 1010, machine-readable medium 1026) can be local, remote, or distributed. Although shown as a single medium, the machine-readable medium 1026 can include multiple media (e.g., a centralized/distributed database and/or associated caches and servers) that store one or more sets of instructions 1028. The machine-readable (storage) medium 1026 can include any medium that is capable of storing, encoding, or carrying a set of instructions for execution by the computer system 1000. The machine-readable medium 1026 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory, removable memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 1008, 1028) set at various times in various memory and storage devices in computing device(s). When read and executed by the processor 1002, the instruction(s) cause the computer system 1000 to perform operations to execute elements involving the various aspects of the disclosure.

Figure 11:
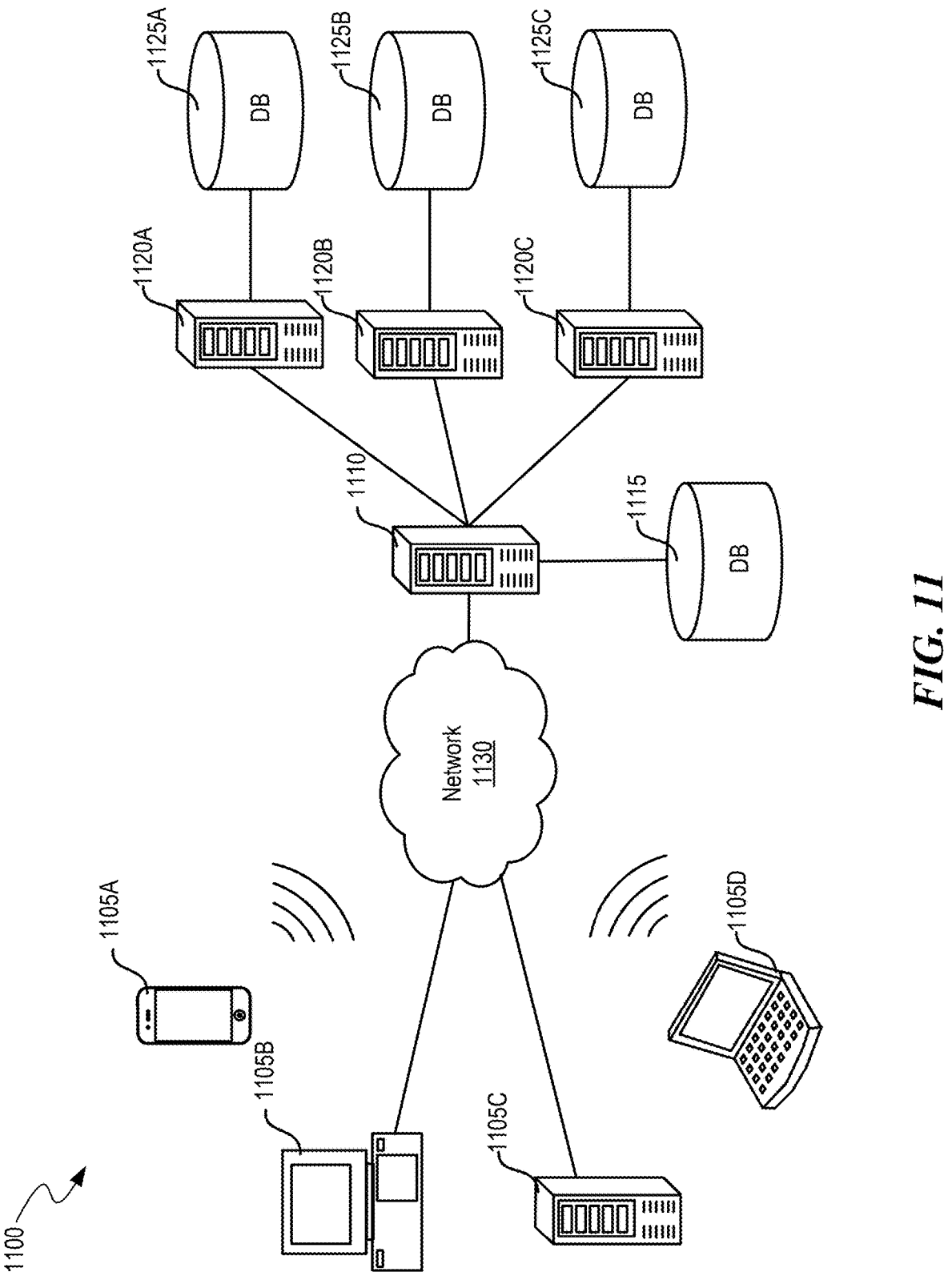
FIG. 11 is a system diagram illustrating an example of a computing environment in which the agent management platform operates, in accordance with some implementations of the present technology.

FIG. 11 is a system diagram illustrating an example of a computing environment in which the disclosed system operates in some implementations. In some implementations, environment 1100 includes one or more client computing devices 1105A-D, examples of which can host the agent management platform of FIG. 9. Client computing devices 1105 operate in a networked environment using logical connections through network 1130 to one or more remote computers, such as a server computing device.

In some implementations, server computing device 1110 is an edge server which receives client requests and coordinates fulfillment of those requests through other servers, such as servers 1120A-C. In some implementations, server computing devices 1110 and 1120 comprise computing systems, such as the agent management platform of FIG. 9. Though each server computing device 1110 and 1120 is displayed logically as a single server, server computing devices can each be a distributed computing environment encompassing multiple computing devices located at the same or at geographically disparate physical locations. In some implementations, each server computing device 1120 corresponds to a group of servers.

Client computing devices 1105 and server computing devices 1110 and 1120 can each act as a server or client to other server or client devices. In some implementations, servers (1110, 1120A-C) connect to a corresponding database (1115, 1125A-C). As discussed above, each server computing device 1120 can correspond to a group of servers, and each of these servers can share a database or can have its own database. Databases 1115 and 1125 warehouse (e.g., store) information such as claims data, email data, call transcripts, call logs, policy data and so on. Though databases 1115 and 1125 are displayed logically as single units, databases 1115 and 1125 can each be a distributed computing environment encompassing multiple computing devices, can be located within their corresponding server, or can be located at the same or at geographically disparate physical locations.

Network 1130 can be a local area network (LAN) or a wide area network (WAN), but can also be other wired or wireless networks. In some implementations, network 1130 is the Internet or some other public or private network. Client computing devices 1105 are connected to network 1130 through a network interface, such as by wired or wireless communication. While the connections between server computing device 1110 and server computing devices 1120 are shown as separate connections, these connections can be any kind of local, wide area, wired, or wireless network, including network 1130 or a separate public or private network.

CONCLUSION

Unless the context clearly requires otherwise, throughout the description and the claims, the words "comprise," "comprising," and the like are to be construed in an inclusive sense, as opposed to an exclusive or exhaustive sense—that is to say, in the sense of "including, but not limited to." As used herein, the terms "connected," "coupled," and any variants thereof mean any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number can also include the plural or singular number, respectively. The word "or," in reference to a list of two or more items, covers all of the following interpretations of the word: any of the items in the list, all of the items in the list, and any combination of the items in the list.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations can perform routines having operations, or employ systems having blocks, in a different order, and some processes or blocks can be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel or can be performed at different times. Further, any specific numbers noted herein are only examples; alternative implementations can employ differing values or ranges.

The teachings of the technology provided herein can be applied to other systems, not necessarily the system described above. The elements and acts of the various examples described above can be combined to provide further implementations of the technology. Some alternative implementations of the technology can include additional elements to those implementations noted above or can include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system can vary considerably in its specific implementation while still being encompassed by the technology disclosed herein. As noted above, specific terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects can likewise be embodied as a computer-readable medium claim, or in other forms, such as being embodied in a means-plus-function claim. Any claims intended to be treated under 35 U.S.C. § 112 (f) will begin with the words "means for," but use of the term "for" in any other context is not intended to invoke treatment under 35 U.S.C. § 112 (f). Accordingly, the applicant reserves the right after filing this application to pursue such additional claim forms, either in this application or in a continuing application.

From the foregoing, it will be appreciated that specific implementations of the invention have been described herein for purposes of illustration, but that various modifications can be made without deviating from the scope of the invention. Accordingly, the invention is not limited except as by the appended claims.

We claim:

1. A non-transitory computer-readable storage medium comprising instructions for maintaining agent memory of artificial intelligence (AI) agents stored thereon, wherein the instructions when executed by at least one data processor of a system, cause the system to:

receive, from a requestor autonomous AI agent that operates on a computing device, a memory storage request to store operational data of the requestor autonomous AI agent, wherein the operational data comprises a token set that defines one or more operational state variables for one or more tasks historically executed by the requestor autonomous AI agent;

classify the operational data using a hierarchical ontological data structure that organizes a predefined taxonomic node set associated with the requestor autonomous AI agent into multiple tiers by:

mapping the operational data to a subset of the predefined taxonomic node set using a distance between (a) a vector representation of at least a portion of the operational data with (b) a vector representation of each taxonomic node of the predefined taxonomic node set, and generating an ontological reference pointer for the operational data that defines a position of the taxonomic node subset within the hierarchal ontological data structure, wherein the ontological reference pointer encodes a hierarchical path from a root node of the hierarchical ontological data structure to the taxonomic node subset, and wherein the position of the taxonomic node subset is represented using one or more directed graph connections within the hierarchical ontological data structure that links the taxonomic node subset to one or more of: (a) a higher-level taxonomic node positioned in a higher tier than the taxonomic node subset within the hierarchical ontological data structure or (b) a lower-level taxonomic node positioned in a lower tier than the taxonomic node subset within the hierarchical ontological data structure;

construct a memory capsule data structure that compresses the operational data by substituting one or more tokens of the operational data with a representation of the ontological reference pointer;

generate a unique blockchain transaction identifier for the memory capsule data structure by applying a cryptographic hash operation to a concatenated representation of the memory capsule data structure; and store the memory capsule data structure in a distributed network accessible to multiple autonomous AI agents that include the requestor autonomous AI agent, wherein each autonomous AI agent is represented by a corresponding computing device that participates in the distributed network, and wherein the memory capsule data structure is stored by broadcasting the unique blockchain transaction identifier to each computing device.

2. The non-transitory computer-readable storage medium of claim 1, wherein the memory capsule data structure is a first memory capsule data structure, and wherein the instructions further cause the system to:

receive, from a retrieval autonomous AI agent, a memory retrieval request to retrieve a particular memory capsule data structure that satisfies a similarity threshold value with an ontological parameter set;

identify one or more memory capsule data structures stored in the distributed network that match the ontological parameter set by comparing the similarity threshold value against a distance between a vector representation of the ontological parameter set and a vector representation of the stored one or more memory capsule data structures; and transmit, to the retrieval autonomous AI agent, a representation of the one or more memory capsule data structures.

3. The non-transitory computer-readable storage medium of claim 1, wherein the hierarchical ontological data structure is represented using Web Ontology Language (OWL), and wherein the ontological reference pointer defines the position of the taxonomic node subset within an instance layer of the hierarchal ontological data structure.

4. The non-transitory computer-readable storage medium of claim 1, wherein the instructions further cause the system to:

encrypt the operational data within the memory capsule data structure prior to storing the memory capsule data structure in the distributed network;

determine an encryption key associated with the requestor autonomous AI agent;

store the encryption key in a distributed database; and using a retrieval autonomous AI agent, reconstruct the encryption key and decrypt the operational data.

5. The non-transitory computer-readable storage medium of claim 1, wherein the instructions further cause the system to:

receive, from a retrieval autonomous AI agent, a memory retrieval request to retrieve a particular memory capsule data structure that satisfies a similarity threshold value with an ontological parameter set;

generate a memory summary representation for each memory capsule data structure stored in the distributed network;

compare each memory summary representation against the ontological parameter set to generate a score for the memory summary representation; and transmit, to the retrieval autonomous AI agent, one or more memory capsule data structures associated with a score that exceeds the similarity threshold value.

6. The non-transitory computer-readable storage medium of claim 1, wherein the computing device is a first computing device, and wherein the instructions further cause the system to:

identify a priority classification for the memory capsule data structure based on the taxonomic node subset; and in response to the priority classification satisfying a particular value, transmit the memory capsule data structure to a second computing device that is configured to broadcast the memory capsule data structure to multiple computing devices communicatively connected to the second computing device.

7. The non-transitory computer-readable storage medium of claim 1, wherein the instructions further cause the system to:

generate a zero-knowledge cryptographic proof for the memory capsule data structure;

receive, from a verifying autonomous AI agent of the multiple autonomous AI agents, a validation request that includes verification parameter set; and transmit, to the verifying autonomous AI agent, the zero-knowledge cryptographic proof, wherein the zero-knowledge cryptographic proof is configured to validate the verification parameter set against the memory capsule data structure.

8. A computer-implemented method for maintaining agent memory of artificial intelligence (AI) agents, the computer-implemented method comprising:

obtain, from a requestor autonomous AI agent, a storage request to store operational data of the requestor autonomous AI agent, wherein the operational data comprises a token set that defines one or more operational state variables for one or more tasks executed by the requestor autonomous AI agent;

classify the operational data using a hierarchical ontological data structure that organizes a predefined taxonomic node set associated with the requestor autonomous AI agent into multiple tiers by:

mapping the operational data to a subset of the predefined taxonomic node set using a distance between (a) a vector representation of at least a portion of the operational data with (b) a vector representation of each taxonomic node of the predefined taxonomic node set, and determining an ontological reference pointer for the operational data that defines a position of the taxonomic node subset within the hierarchal ontological data structure, wherein the ontological reference pointer encodes a hierarchical path from a root node of the hierarchical ontological data structure to the taxonomic node subset;

construct a memory capsule data structure that compresses the operational data by substituting one or more tokens of the operational data with a representation of the ontological reference pointer;

generate a unique blockchain transaction identifier for the memory capsule data structure by applying a cryptographic hash operation to a concatenated representation of the memory capsule data structure; and store the memory capsule data structure in a distributed network accessible to multiple autonomous AI agents that include the requestor autonomous AI agent by broadcasting the unique blockchain transaction identifier to the multiple autonomous AI agents.

9. The computer-implemented method of claim 8, wherein the method further comprises:

assign a temporal weight value to the memory capsule data structure based on a time elapsed since creation of the operational data;

apply an exponential decay function to the temporal weight value to generate a temporal score for the memory capsule data structure; and modify a priority score of the memory capsule data structure based on the temporal score, wherein the priority score is used to retrieve the memory capsule data structure.

10. The computer-implemented method of claim 8, wherein the memory capsule data structure comprises:

a header data block that includes one or more of unique capsule identifier or protocol version number, a metadata data block that includes one or more of the ontological reference pointer or temporal metadata associated with the operational data, and a compressed content data block that includes the operational data compressed using the representation of the ontological reference pointer.

11. The computer-implemented method of claim 8, further comprising:

maintaining a least-recently-used cache of memory capsule data structures accessed by a retrieval autonomous AI agent within the multiple autonomous AI agents.

12. The computer-implemented method of claim 11, wherein the method further comprises:

using the least-recently-used cache, determining an access pattern set of the requestor autonomous AI agent that identifies one or more taxonomic node subsets accessed beyond a threshold value; and retrieving one or more memory capsule data structures associated with the one or more taxonomic node subsets.

13. The computer-implemented method of claim 8, wherein storing the memory capsule data structure comprises:

determining an access pattern set of the requestor autonomous AI agent that identifies one or more taxonomic node subsets accessed beyond a threshold value; and replicating one or more memory capsule data structures associated with the one or more taxonomic node subsets across multiple computing devices in the distributed network.

14. The computer-implemented method of claim 8, wherein constructing the memory capsule data structure comprises:

generating a compressed memory summary using the ontological reference pointer as a compression dictionary; and storing the compressed memory summary in the memory capsule data structure.

15. A system comprising:

at least one hardware processor; and at least one non-transitory memory storing instructions, which, when executed by the at least one hardware processor, cause the system to:

obtain, from a requestor autonomous AI agent, a storage request to store operational data of the requestor autonomous AI agent;

classify the operational data using an ontological data structure that organizes a taxonomic node set associated with the requestor autonomous AI agent by:

mapping the operational data to a subset of the taxonomic node set by comparing a representation of at least a portion of the operational data with a representation of one or more taxonomic nodes of the taxonomic node set, and determining an ontological reference pointer for the operational data that defines a position of the taxonomic node subset within the ontological data structure, wherein the ontological reference pointer encodes a hierarchical path from a root node of the hierarchical ontological data structure to the taxonomic node subset;

construct a memory capsule data structure that compresses the operational data using the ontological reference pointer; and store the memory capsule data structure in a distributed network accessible to multiple autonomous AI agents that include the requestor autonomous AI agent by broadcasting a representation of the memory capsule data structure to the multiple autonomous AI agents.

16. The system of claim 15, wherein the instructions further cause the system to:

receive multiple memory retrieval requests for different memory capsule data structures from a retrieval autonomous AI agent within the multiple autonomous AI agents;

batch the multiple memory retrieval requests into a single network transmission that includes representations of the different memory capsule data structures; and transmit the single network transmission to the retrieval autonomous AI agent.

17. The system of claim 15, wherein the instructions further cause the system to:

receive multiple memory retrieval requests for different memory capsule data structures from a retrieval autonomous AI agent within the multiple autonomous AI agents;

group the different memory capsule data structures into multiple batch transmissions; and synchronize the multiple batch transmissions across the multiple autonomous AI agents in multiple phases.

18. The system of claim 15, wherein the instructions further cause the system to:

store metadata references that identify the memory capsule data structure in a blockchain transaction; and store the memory capsule data structure in an off-chain distributed storage.

19. The system of claim 15, wherein the instructions further cause the system to:

partition the distributed network into multiple blockchain shards based on the ontological data structure; and distribute multiple memory capsule data structures across the multiple blockchain shards in accordance with a respective ontological reference pointer of each memory capsule data structure.

20. The system of claim 15, wherein the instructions further cause the system to:

obtain a network topology state between multiple computing devices in the distributed network; and select a routing path for transmission of a particular memory capsule data structure between the multiple computing devices based on the network topology state.

* * * * *